(12) United States Patent
Sherman et al.

(10) Patent No.: US 6,249,868 B1
(45) Date of Patent: Jun. 19, 2001

(54) METHOD AND SYSTEM FOR EMBEDDED, AUTOMATED, COMPONENT-LEVEL CONTROL OF COMPUTER SYSTEMS AND OTHER COMPLEX SYSTEMS

(75) Inventors: Edward G. Sherman, London (GB);
Mark P. Sherman, Seattle, WA (US);
George M. Reed, Saratoga, CA (US);
Larry Saunders, San Diego, CA (US);
Wayne Goldman, Sausalito, CA (US);
Simon Whittie, Gladesville (AU)

(73) Assignee: Softvault Systems, Inc., Seattle, WA (US)

( * ) Notice: Subject to any disclaimer, the term of this patent is extended or adjusted under 35 U.S.C. 154(b) by 0 days.

(21) Appl. No.: 09/163,094

(22) Filed: Sep. 29, 1998

Related U.S. Application Data

(63) Continuation-in-part of application No. 09/047,975, filed on Mar. 25, 1998.

(51) Int. Cl.[7] .................................................. G06F 9/00
(52) U.S. Cl. ..................... 713/168; 713/169; 713/200; 713/201; 380/255
(58) Field of Search ........................... 380/255; 713/168, 713/169, 200, 201

(56) References Cited

U.S. PATENT DOCUMENTS 6,148,083 * 11/2000 Fieres et al. ..................... 380/255
6,148,333 * 11/2000 Guedalia et al. ................. 709/219
6,157,953 * 12/2000 Chang et al. ..................... 709/225
6,158,010 * 12/2000 Moriconi et al. ................. 713/201

* cited by examiner

Primary Examiner—Thomas R. Peeso
(74) Attorney, Agent, or Firm—Robert W. Bergstrom

(57) ABSTRACT

A method and system for protecting and controlling personal computers ("PCs") and components installed in or attached to PCs. The method and system may be used to protect PCs from use after being stolen. An exemplary embodiment of the system includes a server running on a remote computer and hardware-implemented agents embedded within the circuitry that controls the various devices within a PC. The agents intercept all communications to and from the devices into which they are embedded, passing the communications when authorized to do so, and blocking communications when not authorized, effectively disabling the devices. Embedded agents are continuously authorized from the remote server computer by handshake operations implemented as communications messages. When the PC is stolen or otherwise disconnected from the remote server, the embedded agents within the PC fail to receive further authorizations, disable the devices into which they are embedded, and effectively prevent any use of the stolen or disconnected PC. The method and system may also be used to control and manage access to software stored within the PC and to control and manage operation of hardware and software components within the PC.

73 Claims, 21 Drawing Sheets

METHOD AND SYSTEM FOR EMBEDDED, AUTOMATED, COMPONENT-LEVEL CONTROL OF COMPUTER SYSTEMS AND OTHER COMPLEX SYSTEMS

RELATED APPLICATIONS

This application is a continuation-in-part of co-pending U.S. application Ser. No. 09/047,975 that was filed on Mar. 25, 1998.

TECHNICAL FIELD

The present invention relates to control of computer systems and other types of complex systems at the component level and, in particular, to a method and system for securing a complex system by embedding agents within one or more components of the complex system in order to control access to components within the complex system.

BACKGROUND OF THE INVENTION

Computer security is a very broad and complex field within which, during the past several decades, a number of important sub-fields have developed and matured. These sub-fields address the many different problem areas in computer security, employing specialized techniques that are particular to specific problems as well as general techniques that are applicable in solving a wide range of problems. The present application concerns a technique that can be used to prevent the theft and subsequent use of a personal computer ("PC") or of various PC components included in, or attached to, a PC. This technique may make use of certain security-related techniques which have been employed previously to address other aspects of computer security, and this technique may itself be employed to address both computer security problems other than theft as well as various aspects of computer reliability, computer administration, and computer configuration. In addition, this technique may be applied to protecting other types of complex electronic and mechanical systems as well as computer software and other types of information encoded on various types of media.

PCs are ubiquitous in homes, offices, retail stores, and manufacturing facilities. Once a curiosity possessed only by a few hobbyists and devotees, the PC is now an essential appliance for business, science, professional, and home use. As the volume of PCs purchased and used has increased, and as PC technology has rapidly improved, the cost of PCs has steadily decreased. However, a PC is still a relatively expensive appliance, especially when the cost of the software installed on the PC and the various peripheral devices attached to the PC are considered. PCs, laptop PCs, and even relatively larger server computers have all, therefore, become attractive targets for theft.

FIG. 1 illustrates various types of security systems commonly employed to prevent theft of PCs and PC components. A PC 102 is mounted on a table 104 and is connected to a keyboard-input device 106 and a display monitor 108. The PC 102 is physically secured to the table 104 with a hinged fastening device 110, which can be opened and locked by inserting a key 112 into a lock 114. The display monitor 108 is physically attached to the table via a cable 116 and cylindrical combination lock 118 system. Serial numbers 120 or 122 are attached to, or imprinted on, the side of the PC 102 and the side of the display monitor 108, respectively. Finally, there is a software-implemented lock and key system for controlling access to the operating system and hence to the various application programs available on the PC 102. Typically, a graphical password-entry window 124 is displayed on the screen 126 of the display monitor 108. In order to use the computer, the user types a password via the keyboard 106 into the password sub-window 128 of the password-entry window 124. The user then depresses a keyboard key to indicate to a security program that password entry is complete. As the user types the password, each letter of the password appears at the position of a blinking cursor 130. The characters of the password are either displayed explicitly, or, more commonly, asterisks or some other punctuation symbol are displayed to indicate the position within the password in which a character is entered so that an observer cannot read the password as it is entered by the user. The security program checks an entered password against a list of authorized passwords and allows further access to the operating system only when the entered password appears in the list. In many systems, both a character string identifying the user and a password must be entered by the user in order to gain access to the operating system.

The common types of security systems displayed in FIG. 1 are relatively inexpensive and are relatively easily implemented and installed. They are not, however, foolproof and, in many cases, may not provide even adequate deterrents to a determined thief. For example, the key 112 for the hinged fastening device 110 can be stolen, or the fastening device can be pried loose with a crowbar or other mechanical tool. A clever thief can potentially duplicate the key 112 or jimmy the lock 114. The cable 116 can be cut with bolt cutters or the cylindrical combination lock 118 can be smashed with a hammer. Often, the combination for the cylindrical combination lock 118 is written down and stored in a file or wallet. If that combination is discovered by a thief or accomplice to theft, the cylindrical combination lock will be useless. In the situation illustrated in FIG. 1, if the table is not bolted to the floor, a thief might only need to pick up the display monitor 108, place it on the floor, slide the cable down the table leg to the floor, and lift the table sufficiently to slip the cable free. While this example might, at first glance, seem silly or contrived, it is quite often the case that physical security devices may themselves be more secure than the systems in which they are installed, taken as a whole. This commonly arises when security devices are installed to counter certain obvious threats but when less obvious and unexpected threats are ignored or not considered.

While the serial numbers 120 and 122, if not scraped off or altered by a thief, may serve to identify a PC or components of the PC that are stolen and later found, or may serve as notice to an honest purchaser of second-hand equipment that the second-hand equipment was obtained by illegal means, they are not an overpowering deterrent to a thief who intends to use a purloined PC or PC component at home or to sell the purloined PC to unsavory third parties.

Password protection is commonly used to prevent malicious or unauthorized users from gaining access to the operating system of a PC and thus gaining the ability to examine confidential materials, to steal or corrupt data, or to transfer programs or data to a disk or to another computer from which the programs and data can be misappropriated. Passwords have a number of well-known deficiencies. Often, users employ easily remembered passwords, such as their names, their children's names, or the names of fictional characters from books. Although not a trivial undertaking, a determined hacker can often discover such passwords by repetitive trial and error methods. As with the combination for the cylindrical combination lock 118, passwords are often written down by users or revealed in conversation. Even if the operating system of the PC is inaccessible to a thief who steals the PC, that thief may relatively easily interrupt the boot process, reformat the hard drive, and reinstall the operating system in order to use the stolen computer.

More elaborate security systems have been developed or proposed to protect various types of electrical and mechanical equipment and to protect even living creatures. For example, one can have installed in a car an electronic device that can be remotely activated by telephone to send out a homing signal to mobile police receivers. As another example, late model Ford and Mercury cars are equipped with a special electronic ignition lock, which is activated by a tiny transmitter, located within a key. As still another example, small, integrated-circuit identification tags can now be injected into pets and research animals as a sort of internal serial number. A unique identification number is transmitted by these devices to a reading device that can be passed over the surface of the pet or research animal to detect the unique identification number. A large variety of different data encryption techniques have been developed and are commercially available, including the well known RSA public/private encryption key method. Devices have been built that automatically generate computer passwords and that are linked with password devices installed within the computer to prevent hackers from easily discovering passwords and to keep the passwords changing at a sufficient rate to prevent extensive access and limit the damage resulting from discovery of a single password.

While many of these elaborate security systems are implemented using highly complex circuitry and software based on complex mathematical operations, they still employ, at some level, the notion of a key or password that is physically or mentally possessed by a user and thus susceptible to theft or discovery. A need has therefore been recognized for a security system for protecting PCs and components of PCs from theft or misuse that does not depend on physical or software implemented keys and passwords possessed by users. Furthermore, a need has been similarly recognized for intelligent security systems to protect the software that runs on PCs and to protect other types of complex electronic and mechanical systems, including automobiles, firearms, home entertainment systems, and creative works encoded in media for display or broadcast on home entertainment systems.

SUMMARY OF THE INVENTION

One embodiment of the present invention provides a security system for protecting a PC and components installed in or attached to the PC from use after being stolen. Agents are embedded within various devices within the PC. The agents are either hardware-implemented logic circuits included in the devices or firmware or software routines running within the devices that can be directed to enable and disable the devices in which they are embedded. The agents intercept communications to and from the devices into which they are embedded, passing the communications when authorized to do so in order to enable the devices, and blocking communications when not authorized, effectively disabling the devices. Embedded agents are continuously authorized from a remote server computer, which is coupled to embedded agents via a communications medium, by handshake operations implemented as communications messages. When the PC is disconnected from the communications link to the remote server, as happens when the PC is stolen, the devices protected by embedded agents no longer receive authorizations from the remote server and are therefore disabled. User-level passwords are neither required nor provided, and the security system cannot be thwarted by reinstalling the PC's operating system or by replacing programmable read only memory devices that store low-level initialization firmware for the PC.

Alternative embodiments of the present invention include control and management of software and hardware on a pay-to-purchase or pay-per-use basis, adaptive computer systems, and control and security of electrical and electromechanical systems other than computers. A computer system may be manufactured to include various optional hardware and software components controlled by embedded agents and initially disabled. When the purchaser of the computer system later decides to purchase an optional, preinstalled but disabled component, the manufacturer can enable the component by authorizing an associated embedded agent upon receipt of payment from the owner of the system. Similarly, the owner of the computer system may choose to rent an optional component for a period of time, and that component can then be authorized for the period of time by the manufacturer upon receipt of payment. Software may be manufactured to require authorization from a server via an embedded agent either located within the disk drive on which the software is stored or located within the software itself. Computer systems may automatically adjust their configuration in response to changes in workload by enabling and disabling components via embedded agents. Finally, systems other than computers, including industrial machine tools, processing equipment, vehicles, and firearms may be controlled and secured by embedding agents within one or more components included in the systems.

DETAILED DESCRIPTION OF THE INVENTION

Figure 1:
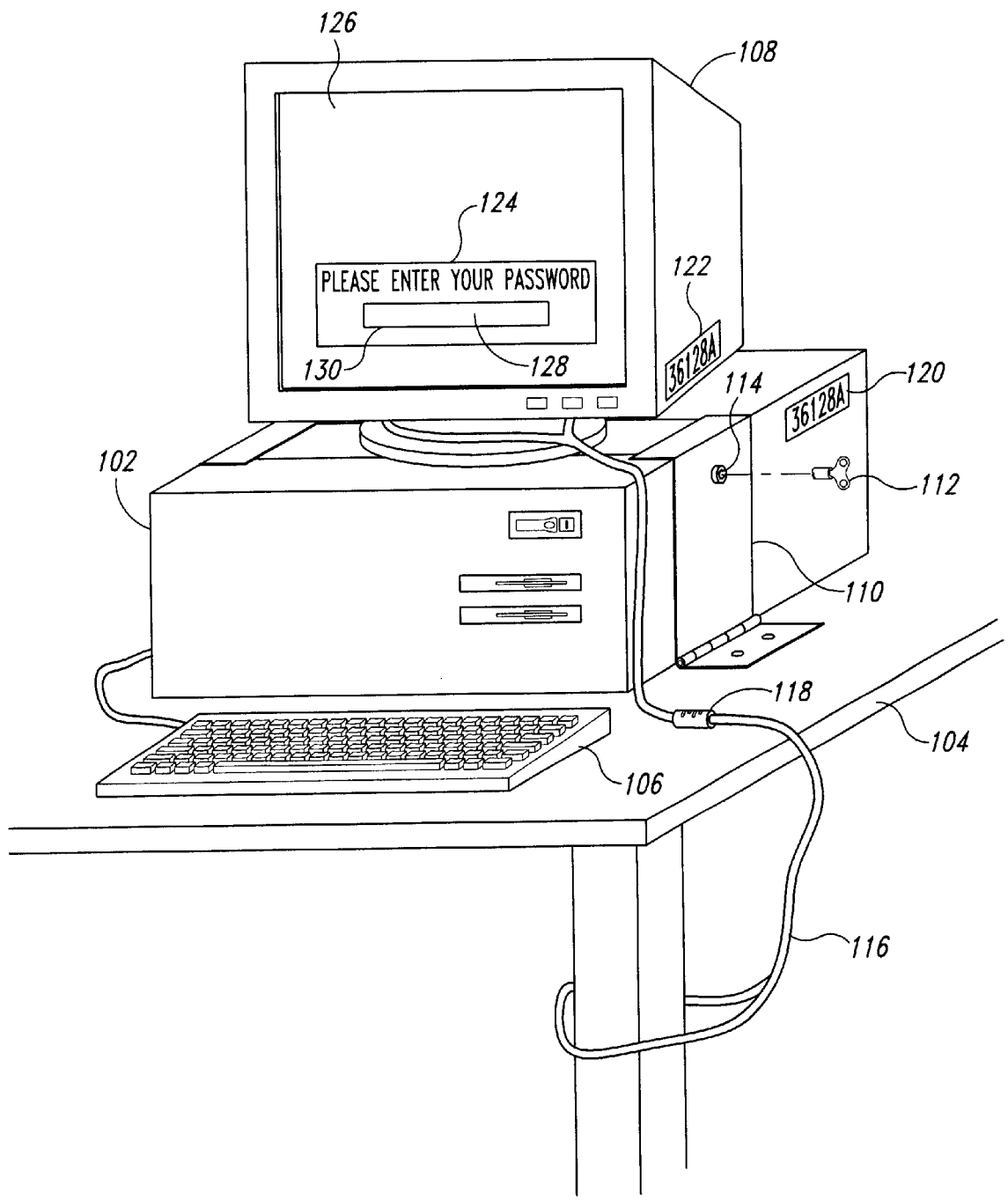
FIG. 1 illustrates various types of security systems commonly employed to prevent theft of PCs and PC components.

One embodiment of the present invention is an embedded agent security system ("EASS") for protecting a PC, and, more particularly, the internal components of a PC, from misuse or misappropriation. The EASS includes a server component, one or more embedded agents, and, optionally, a client component The server component is a centralized repository and control point that provides authorizations to agents embedded within PC components and connected to the server component via a communications connection. The server authorizations allow the embedded agents to enable operation of the components within which the embedded agents reside for a period of time. The server component runs on a separate server computer, which is connected by a communications medium to the PC. An embedded agent is embedded as a logic circuit within the circuitry that controls operation of an internal component of the PC or is embedded as a firmware or software routine that runs within the internal component of the PC. The client component, when present, runs as a software process on the PC. The client component of the EASS primarily facilitates communications between the server component and the various embedded agents. For example, when multiple embedded agents are included in the PC, the client component may serve as a distribution and collection point for communications between the server component and the multiple embedded agents.

Because embedded agents enable operation of the internal components in which they are embedded, and because embedded agents require frequent authorizations from the server component in order to enable the internal components, if the communications connection between the server component and an embedded agent is broken, the internal component in which the embedded agent resides will be disabled when the current period of authorization expires. The communications connection between the server and all embedded agents within the PC will be broken when the PC is powered down or disconnected from the external communications medium by which the PC is connected to the server. Thus, any attempt to steal the PC will result in the theft of a PC that will not be operable once the current period of authorization expires. In order to subsequently operate the PC, the thief would need to reconnect the PC to the server and invoke either client or server utilities to reinitialize the embedded agents. These utilities are themselves protected by password mechanisms. The thief cannot circumvent the embedded agents by reinstalling the operating system or by replacing programmable read only memories ("PROMs"). The stolen PC is therefore essentially worthless to the thief, and, perhaps more important, the data stored within the PC is inaccessible to the thief as well as to any other party.

Certain implementations of this embodiment may rely on one or more internal password identification mechanisms. However, unlike the other well-known security systems discussed above, the user of a PC protected by the EASS does not need to possess a password and is, in fact, not allowed to know or possess the passwords used internally within the EASS.

In a preferred implementation of this embodiment, the server and client components are implemented in software and the embedded agents are implemented as hardware logic circuits. However, all three of these components may be implemented either as software routines, firmwave routines, hardware circuits, or as a combination of software, firmware, and hardware.

EASS Hardware and Software Configuration

Figure 2:
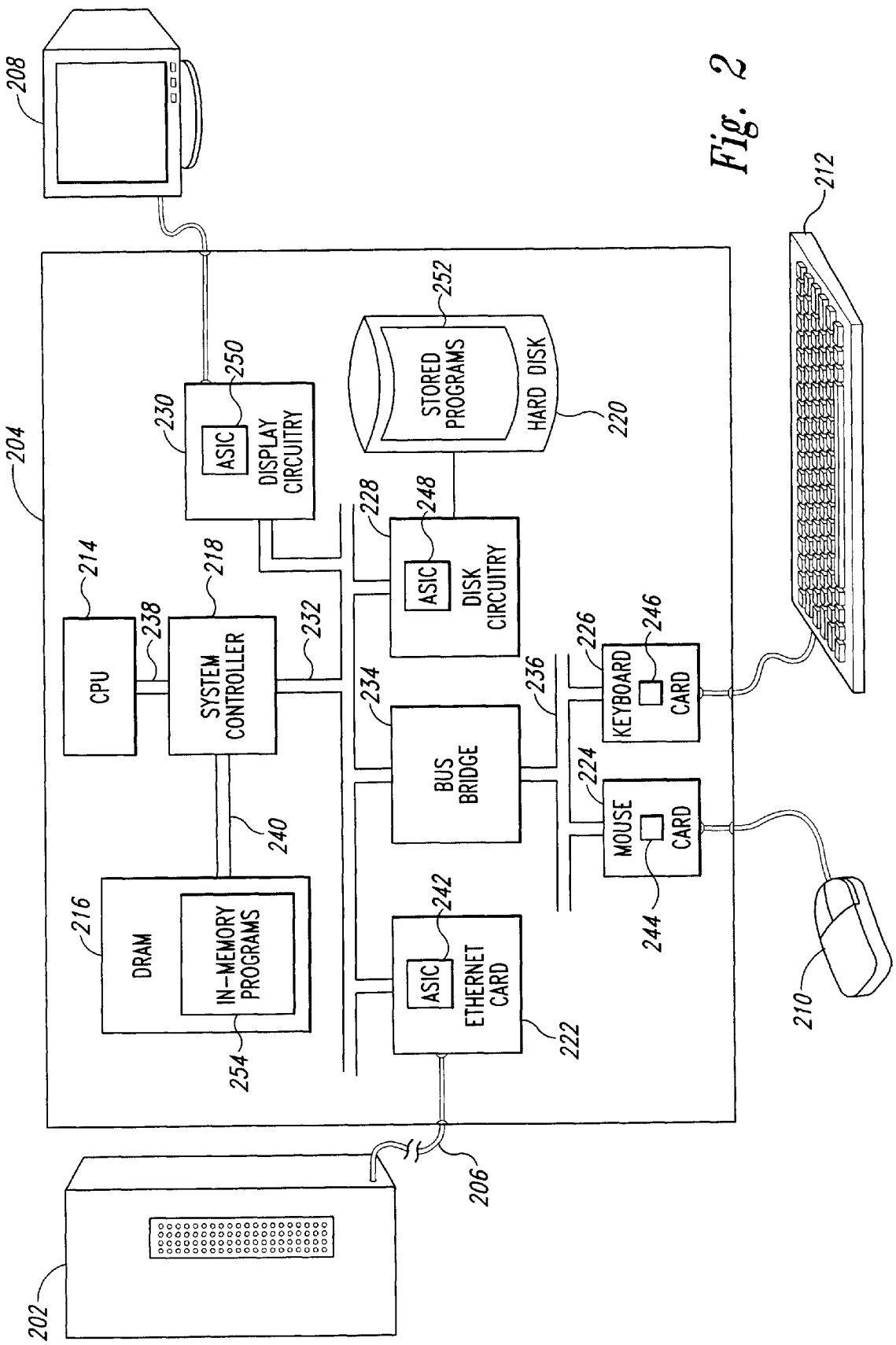
FIG. 2 is a block diagram of example internal components of a PC connected to a remote server.

FIG. 2 is a block diagram of example internal components of a PC connected to a remote server. The remote server 202 is connected to the PC 204 via a connection 206 that represents a local area network which is possibly itself connected to a wide area network and which supports one of any number of common network protocols or combinations of protocols to transfer messages back and forth between the server component 202 and the PC 204. Messages may be transmitted, for example, via the Internet. The PC 204 is connected to an external output device, in this case a display monitor 208, and to two input devices, a mouse 210 and a keyboard 212. Internal components of the PC include a central processing unit ("CPU") 214; a random access memory 216; a system controller 218; a hard disk 220; and a number of device controllers 222, 224, 226, 228, and 230 connected to the system controller 218 directly through a high speed bus 232, such as a PCI bus, or through a combination of the high speed bus 232, a bus bridge 234, and a low speed bus 236 such as an ISA bus. The CPU 214 is connected to the system controller 218 through a specialized CPU bus 238 and the RAM memory 216 is connected to the system controller 218 through a specialized memory bus 240. FIG. 2 represents one possible simple configuration for the internal components of a PC. PCs having different numbers or types of components or employing different connection mechanisms other than PCI or ISA buses may have quite different internal configurations.

The device controllers 222, 224, 226, 228, and 230 are normally implemented as printed circuit boards, which include one or more application specific integrated circuits ("ASICs") 242, 244, 246, 248, and 250. The ASICs, along with firmware that is normally contained in various types of ROM memory on the printed circuit boards, implement both a communications bus interface and a command interface. The communications bus interface allows for data and message communication with operating system routines that run on the CPU 214. The command interface enables the operating system to control the peripheral device associated with the device controller. For example, the hard disk 220 comprises a number of physical platters on which data is stored as tiny magnetized regions of the iron oxide surface of the platters (not shown), a motor for spinning the platters (not shown), and a printed circuit board 228 which implements circuitry and firmware routines that provide a high-level interface to operating system drivers. In modern disks, there is often a printed circuit board that includes an ASIC that is packaged within the disk as well as a printed circuit board card that is connected via a bus to other internal components of the PC, including the system controller 218 and the CPU 214.

Programs that run on the CPU 214, including the operating system and the EASS client, are permanently stored on a hard disk 252 and are transiently stored in RAM 254 for execution by the CPU 214. Logic circuitry that implements the embedded agents of the EASS is included within the ASICs that implement the various device controllers 242, 244, 246, 248, and 250. The device controller may control such devices as optical disk devices, tape drives, modems, and other data sources and communications devices. EASS embedded agents can be additionally included within the circuitry that implements RAM 216, the system controller 218, and even the CPU 214. One skilled in the art will recognize that any circuit in which communications can be intercepted may reasonably host an embedded agent and that many other locations may therefore host embedded agents. Further, a PC 204 may include only a single embedded agent or may include a number of EASS embedded agents.

Figure 3:
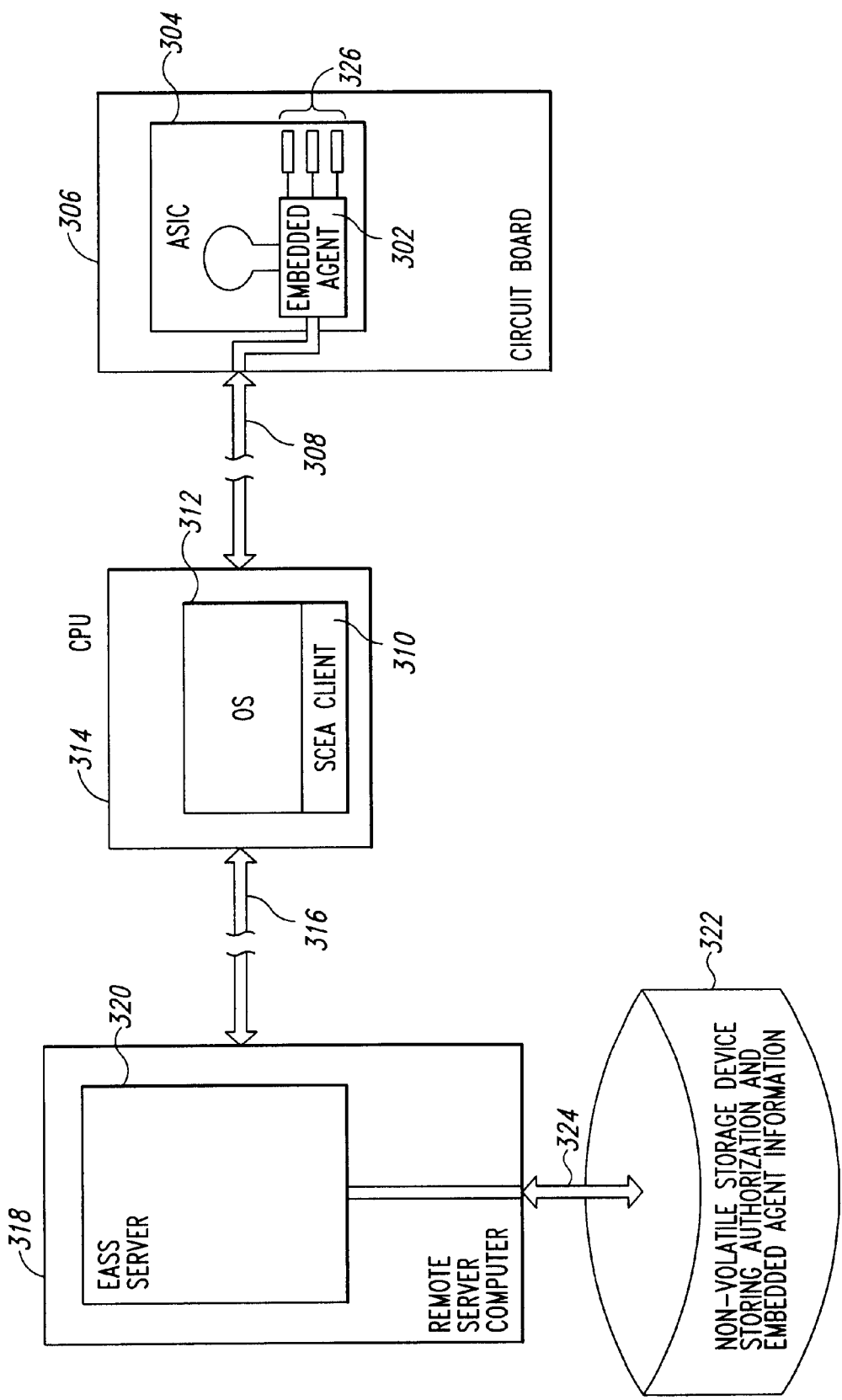
FIG. 3 is a block diagram of example hardware and software components and communications pathways that implement a single embedded agent connected to a client that is, in turn, connected to a security authorization server.

FIG. 3 is a block diagram of example hardware and software components and communications pathways that implement a single embedded agent connected to a client which is, in turn, connected to a security authorization server. In one embodiment, the EASS embedded agent 302 is a logic circuit embedded within an ASIC 304 which is included on a printed circuit board 306 that implements a particular device controller. The device controller is connected through one or more internal communications buses 308 to an EASS client program 310 implemented as a driver within the operating system 312 running on the CPU 314 of the personal computer. The CPU 304 is, in turn, connected through one or more internal buses, such as a PCI bus, and external communication lines, such as a LAN or a LAN combined with a WAN 316, to the server computer 318. The components of the server computer that implement the EASS server include an EASS server program 320 and a non-volatile storage device 322 in which the EASS server program 320 stores authorization and embedded agent information. The EASS server program 320 exchanges information with the non-volatile storage device 322 via internal buses 324 of the server computer 318. There are a variety of ways in which the embedded agent and authorization information can be stored by the EASS server 320 on the non-volatile storage device 322. In one implementation of the described embodiment, this data is stored within a commercial database management system, such as a relational database.

Messages and commands that are passed to the device controller 306 for a particular internal or peripheral device over the communications bus 308 first pass through the EASS embedded agent logic 302 before entering the ASIC circuitry 304 that implements the device controller. The EASS embedded agent 302 is associated with a number of non-volatile registers 326 that store authorization state information. When the embedded agent has been authorized by an EASS server 320, or during a short grace period following power up, the EASS embedded agent passes messages and commands through to the ASIC 304 that implements normal message handling and the device controller. However, when the EASS embedded agent 302 is not authorized by the EASS server 320, or when an initial power-on grace period has expired, the EASS embedded agent blocks messages and commands to the ASIC 304 thereby disabling the device controlled by the device controller 306. The EASS embedded agent thus serves as a hardware-implemented control point by which a device is enabled or disabled. Authorization messages pass from the EASS server 320 through communications pathways 316 and 308 to the EASS embedded agent 302. The EASS embedded agent 302 can also initiate a message and pass the message through pathways 308 and 316 to the EASS server 320. For example, the EASS embedded agent 302 may request authorization from the EASS server 320.

In the described embodiment, the EASS client 310 facilitates communications between the EASS server 320 and the EASS embedded agent 302. When a PC includes more than one EASS embedded agent, the EASS client 310 handles routing of messages from the EASS server 320 to individual EASS embedded agents 302 and collects any messages initiated by EASS embedded agents 302 and forwards them to the EASS server 320. In addition, the EASS client 310 may support a small amount of administrative functionality on the PC that allows the EASS to be reinitialized in the event of loss of connection or power failure. The EASS client 310 may not be a required component in alternative embodiments in which an EASS server 320 communicates directly with EASS embedded agents 302.

In alternative embodiments, the EASS server may communicate with EASS embedded agents by a communications medium based on transmission of optical or radio signals rather than on electrical signals. Moreover, alternate embodiments may employ multiple EASS servers that may be implemented on remote computers or that may be included within the same computer that hosts the EASS embedded agents.

EASS Server and Embedded Agent State Transitions

Figure 4:
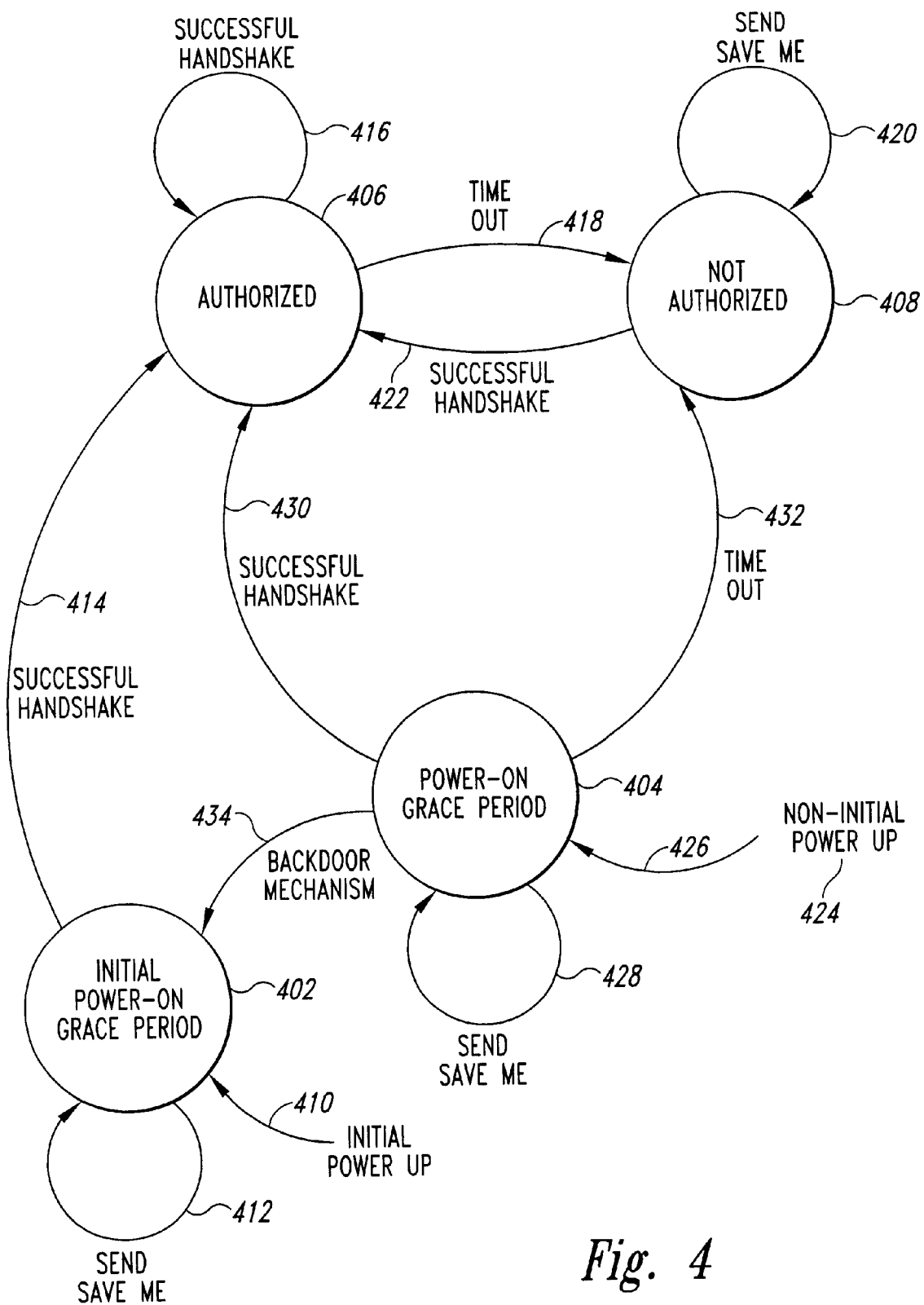
FIG. 4 is a state diagram for an example embedded agent.

FIG. 4 is a state diagram for an example embedded agent. FIG. 4 shows four different states that an EASS embedded agent may occupy: (1) an Initial Power-On Grace Period state 402; (2) a Power-On Grace Period state 404; (3) an Authorized state 406; and (4) a Not Authorized state 408. Transitions between these states arise from three types of events: (1) a successful handshake between the embedded agent and the EASS server that results in transfer of an authorization by the EASS server to the embedded agent to permit operation of the device associated with the EASS embedded agent for some period of time; (2) a time out that occurs when the EASS embedded agent has exhausted its current authorization period prior to receiving a subsequent re-authorization from the EASS server; and (3) a special back-door mechanism that allows an entity such as the EASS client to reinitialize an EASS embedded agent so that the EASS embedded agent can reestablish contact with an EASS server following interruption of a previous connection.

Following an initial power up 410 of the device hosting an EASS embedded agent, the EASS embedded agent enters an Initial Power-On Grace Period 402. The Initial Power-On Grace Period allows operation of the device controlled by the EASS embedded agent for some short period of time following power up of the PC necessary for initialization of the PC that contains the device and embedded agent and allows for establishment of contact between the EASS embedded agent and an EASS server. When in the Initial Power-On Grace Period 410, the EASS embedded agent contains one of a certain number of initial passwords that are recognized by EASS servers as belonging to EASS embedded agents in the Initial Power-On Grace Period. These initial passwords allow an EASS server to distinguish a valid request for handshake operation from an attempt to solicit authorization by an embedded agent that has been previously authorized by an EASS server. In the latter case, the embedded agent may well be hosted by a stolen or misused device. From the Initial Power-On Grace Period state, the EASS embedded agent may send a solicitation message, for example, a "SAVE ME" message to an EASS server to announce that the EASS embedded agent has been powered up for the first time, as indicated by transition arrow 412, and to solicit a handshake operation. Sending of the SAVE ME solicitation message does not, by itself, cause a state transition. When an EASS server receives a SAVE ME message from an EASS embedded agent, the EASS server undertakes sending of an authorization to the EASS embedded agent through a handshake mechanism, to be described below. The handshake may either fail or succeed. If a handshake fails, the EASS embedded agent remains in the state that it occupied prior to initiation of the handshake.

When an EASS embedded agent is in the Initial Power-On Grace Period, a successful handshake operation results in the EASS embedded agent transitioning 414 to an Authorized state 406. At regular intervals, the EASS server continues to reauthorize the EASS embedded agent through successive handshake operations 416 which result in the EASS embedded agent remaining in the Authorized state 406. In the Authorized state 406, the EASS embedded agent passes through commands and data to the device that it controls allowing that device to operate normally. If, for any number of reasons, the EASS embedded agent does not receive reauthorization prior to the expiration of the current authorization that the embedded agent has received from an EASS server, a time out occurs causing transition 418 of the EASS embedded agent to the Not Authorized state 408.

In the Not Authorized state 408, the EASS embedded agent blocks commands and data from being transmitted to the device controlled by the EASS embedded agent, effectively disabling or shutting down the device. Alternatively, the EASS embedded agent may actually power down a device that can be powered down independently from other internal components of the PC. When in the Not Authorized state 408, the EASS embedded agent may send a SAVE ME message 420 to an EASS server. Sending of this message does not, by itself, cause a state transition, as indicated by arrow 420. However, if an EASS embedded agent receives the SAVE ME message and initiates a handshake operation that is successfully concluded, the EASS embedded agent transitions 422 from the Not Authorized state 408 back to the Authorized state 406.

The EASS embedded agent and the device that the EASS embedded agent controls can be powered up any number of times following an initial power up. The EASS embedded agent stores enough information in a number of non-volatile registers associated with the EASS embedded agent (e.g., registers 326 in FIG. 3) to differentiate a normal or non-initial power up from an initial power up. Following a non-initial power up 424, the EASS embedded agent transitions 426 to a Power-On Grace Period state 404. When occupying the Power-On Grace Period state 404, the EASS embedded agent may send a SAVE ME message to an EASS server. The sending of the SAVE ME message 428 does not, by itself, cause a state transition, as indicated by arrow 428. The Power-On Grace Period lasts a short period of time sufficient for the PC to be booted and all of the internal components to be initialized and for the EASS embedded agents controlling those components to establish contact with an EASS server. If an EASS server, upon receiving the SAVE ME message, successfully completes a handshake operation, the EASS embedded agent transitions 430 from the Power-On Grace Period 404 to the Authorized state 406. If a successful handshake operation is not completed before the short Power-On Grace Period authorization period expires 432, the embedded agent transitions 432 from the Power-On Grace Period 404 to the Not Authorized state 408.

A special mechanism is provided for reinitialization of an EASS embedded agent following normal power on. That mechanism is referred to as the "back door" mechanism. The back door mechanism may be initiated, at the direction of a user or administrator, by an EASS client running on the same PC that includes the embedded agent, or may be initiated by an EASS server upon discovery by the EASS server of a failed or interrupted connection. When the EASS embedded agent receives a message that implements the back door mechanism, the EASS embedded agent transitions 434 from the Power-On Grace Period 404 back to the Initial Power-On Grace Period 402. In alternative embodiments, the back door mechanism might allow for transitions from either of the other two states 406 and 408 back to the Initial Power-On Grace Period state. In more complex embodiments, the back door mechanism might allow for transitions to states other than the Initial Power-On Grace Period.

Figure 5:
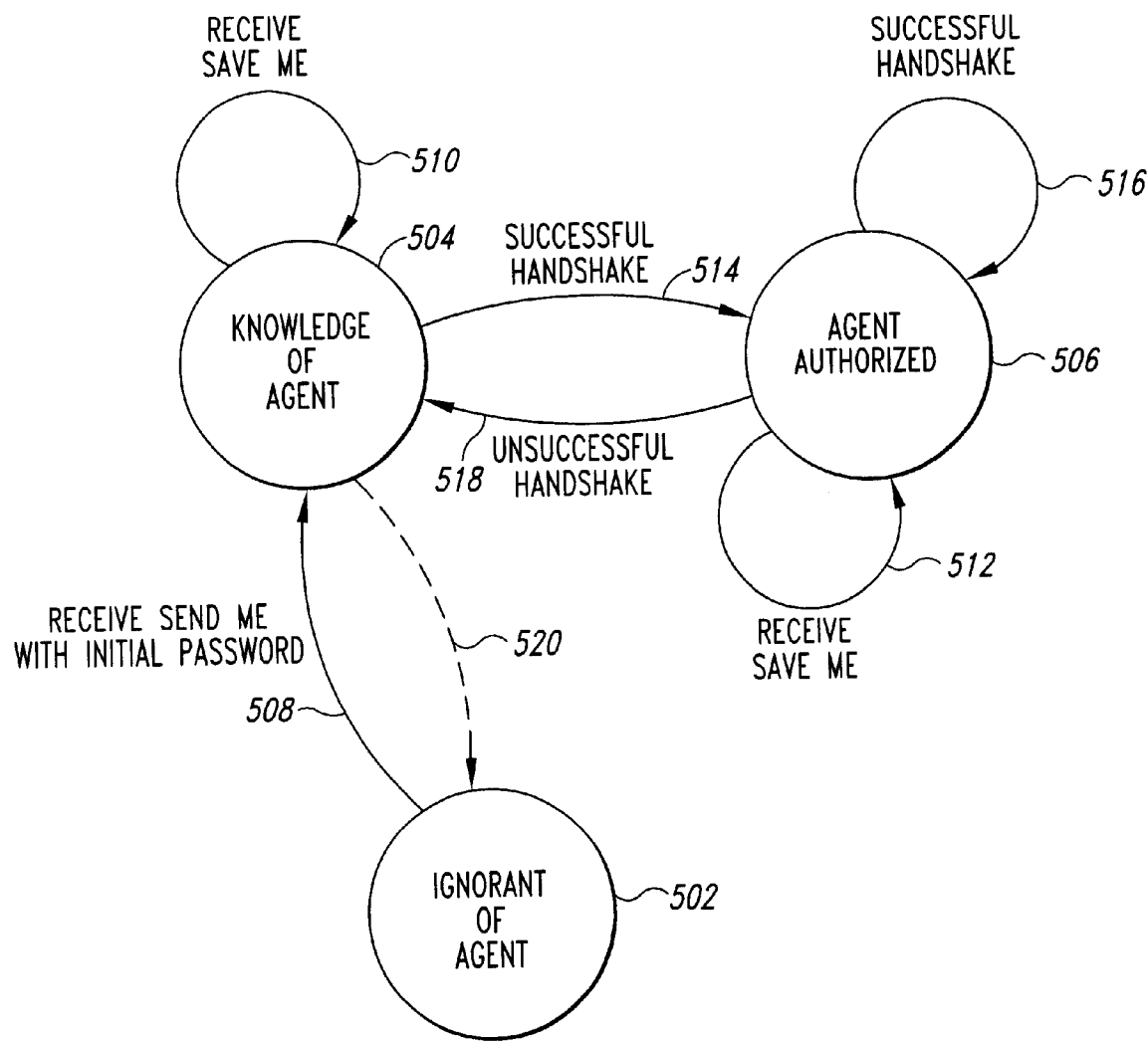
FIG. 5 is an example state diagram for the interaction of a security authorization server with one embedded agent.

FIG. 5 is an example state diagram for the interaction of a security authorization server with one embedded agent.

With respect to an EASS embedded agent, the EASS server may occupy any one of three states at a given instant in time: (1) the EASS server may be in an Ignorant of Agent state 502; (2) the EASS server may be in a Knowledgeable of Agent state, aware of but not having authorized the agent 504; and (3) the EASS server may be in an Agent Authorized state 506. Initially, an EASS server is ignorant of the embedded agent, and thus occupies the Ignorant of Agent state 502. When the EASS server receives a SAVE ME message from the EASS embedded agent that is in the Initial Power-On Grace Period state (402 in FIG. 4), the EASS server transitions 508 from the Ignorant of Agent state 502 to the Knowledgeable of Agent state 504. As part of this transition, the EASS server typically makes an entry into a database or enters a record into a file that allows the EASS server to preserve its awareness of the EASS embedded agent. The EASS server may receive SAVE ME messages from the EASS embedded agent when occupying either the Knowledgeable of Agent state 504 or the Agent Authorized state 506. As indicated by arrows 510 and 512, receipt of SAVE ME messages by the EASS server in either of states 504 and 506 does not, by itself, cause a state transition.

The EASS server may initiate and complete a successful handshake operation with the EASS embedded agent while the EASS server occupies the Knowledgeable of Agent state 504 with respect to an agent. Completion of a successful handshake operation causes the EASS server to transition 514 from the Knowledgeable of Agent state 504 to the Agent Authorized state 506 with respect to the agent. This transition may be accompanied by the saving of an indication in a database or a file by the EASS server that indicates that the embedded agent is authorized for some period of time. When occupying the Agent Authorized state, the EASS server may continue to initiate and complete successful handshake operations with the embedded agent and, by doing so, continue to occupy the Agent Authorized state. However, if a handshake operation is unsuccessful, the EASS server transitions 518 from the Agent Authorized state 506 back to the Knowledgeable of Agent state 504.

In some embodiments of the present invention, there may be an additional transition 520 from the Knowledgeable of Agent state 504 back to the Ignorant of Agent state 502. This transition corresponds to a purging or cleaning operation that allows an EASS server to purge database entries or file records corresponding to a particular EASS embedded agent if the EASS server is unsuccessful in authorizing that EASS embedded agent for some period of time. Such a purging operation allows the EASS server to make room in a database or file to handle subsequent entries for EASS embedded agents that announce themselves using SAVE ME messages from an Initial Power-On Grace Period state.

EASS Messages

Figure 6A:
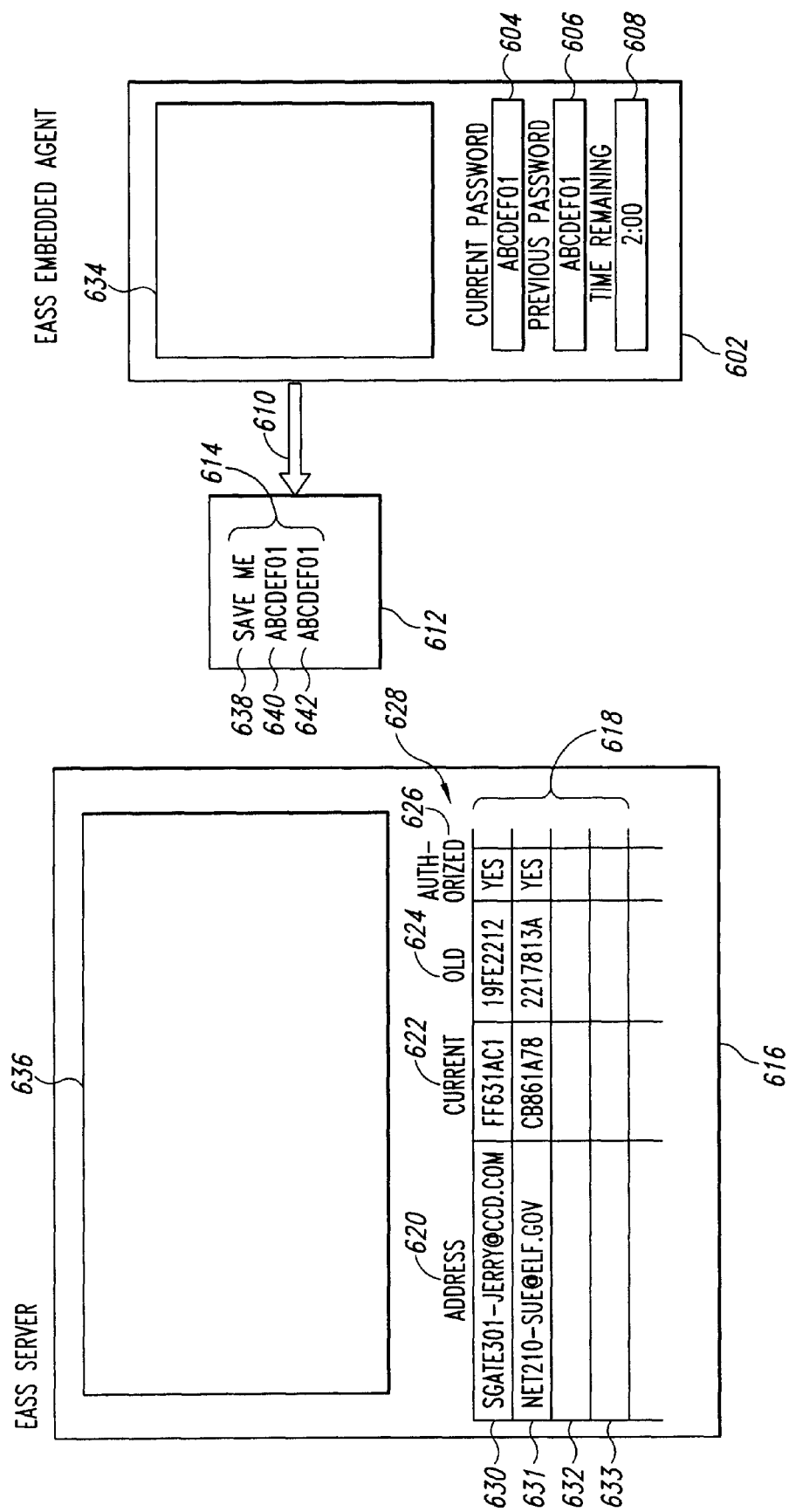
FIG. 6A illustrates an example initiation of the sending of a SAVE ME message by an embedded agent.

FIGS. 6A–9B illustrate details of the sending and receiving of SAVE ME messages and of the EASS server-initiated handshake operation. In each of these figures, example contents of the non-volatile registers associated with an EASS embedded agent, contents of a message, and contents of a portion of the database associated with an EASS server are shown. FIG. 6A will be numerically labeled and described in the discussion below, but the labels will be repeated in FIGS. 6B–9B only when the labels are relevant to an aspect of the EASS in the figure referenced in the discussion of the figure.

FIG. 6A illustrates initiation of the sending of a SAVE ME message by an EASS embedded agent. The EASS embedded agent 602 is associated with three non-volatile registers that contain: (1) the current password 604; (2) the previous password 606; and (3) the time remaining for the current authorization period 608. Passwords may comprise computer words of 56 bits, 64 bits, or a larger number of bits that provide a sufficiently large number of unique initial passwords. The direction of propagation of the SAVE ME message is indicated by arrow 610. The SAVE ME message 612 being transmitted is displayed along with its informational content 614. The EASS server 616 contains a representation of a portion of a database that contains information about EASS embedded agent authorizations 618. This database contains columns that indicate the communications or network address of the EASS embedded agent 620, the EASS embedded agent's current password 622, the EASS embedded agent's previous password 624, and an indication of whether the EASS embedded agent is currently authorized or not 626. Additional or alternative columns may be present. For example, the next column 628 is used in subsequent figures to store the amount of time for which the EASS embedded agent is authorized. Each row in the database 630–633 represents one particular EASS embedded agent. Rows 630 and 631 contain information for previously authorized EASS embedded agents (not shown). EASS embedded agent 602 of FIG. 6A is in the Initial Power-On Grace Period state (402 of FIG. 4) and the EASS server 616 of FIG. 6A is, with respect to the embedded agent 602, in the Ignorant of Agent state (502 of FIG. 5). Rectangular inclusions 634 and 636 represent the implementation of, and any volatile storage associated with, the EASS embedded agent and the EASS server, respectively.

In one embodiment, when the EASS embedded agent 602 is in the Initial Power-On Grace Period, it has an initial time remaining period of two minutes, as indicated by the contents of the time remaining non-volatile register 608. This initial time remaining period is chosen to be sufficient for the EASS embedded agent 602 to establish a connection with the EASS server 616, to solicit a handshake operation, and to complete the solicited handshake operation and may vary in duration for different types of computers. Both the current password register 604 and the previous password register 606 contain a default initial password that is recognized by EASS servers as corresponding to an EASS embedded agent in the Initial Power-On Grace Period state. It should be noted that there may be a great number of different such default passwords. In the described embodiment, the circuitry that implements the EASS embedded agent notes that the authorization time remaining is two minutes, and that it is therefore necessary for the EASS embedded agent 602 to send a SAVE ME message 612 to an EASS server to request continuation of authorization. Thus, the EASS embedded agent 602 initiates sending of the SAVE ME message 612.

The SAVE ME message 612 contains an indication or operation code 638 designating the message as a SAVE ME message, the contents of the current password register 640, and the contents of the previous password register 642. In the case of an EASS embedded agent in the Initial Power-On Grace Period state, both the current password and previous password registers contain the same initial password in the present embodiment. Alternative embodiments might use different initial current and previous passwords. In general, sending both the current password and the previous password provides sufficient information for the EASS server that receives the SAVE ME message to correct any errors or discrepancies that may have arisen during a previous failed handshake. An example of a recovery from a failed handshake operation will be described below with reference to FIGS. 9A–B.

Figure 6B:
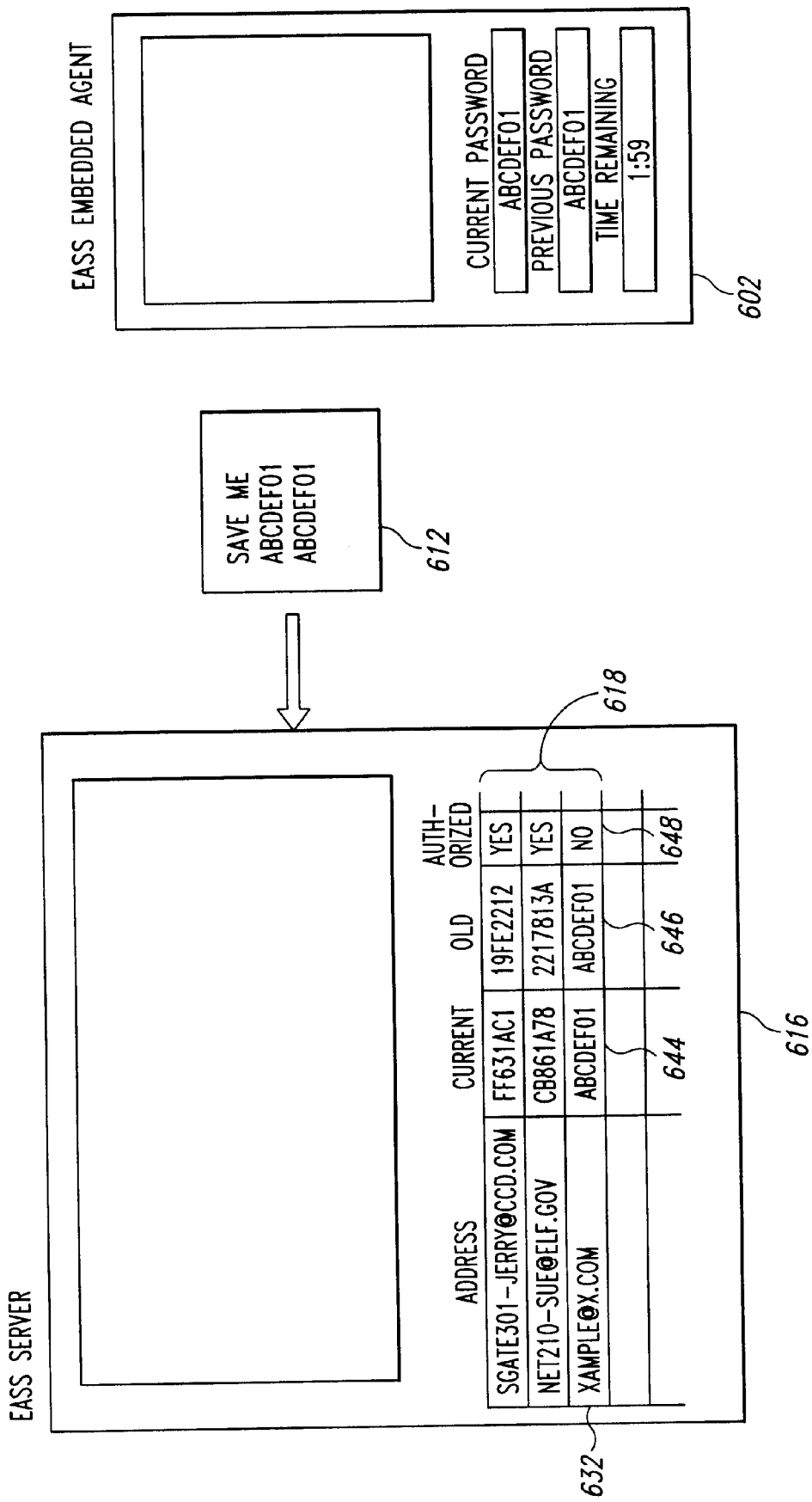
FIG. 6B illustrates an example receipt of a SAVE ME message by a security authorization server.

FIG. 6B illustrates receipt of a SAVE ME message by an EASS server. In this case, the EASS server 616 was, prior to receipt of the SAVE ME message, in the Ignorant of Agent state (502 of FIG. 5) with respect to the EASS embedded agent 602. Receipt of the SAVE ME message 612 causes the EASS server 616 to transition to the Knowledgeable of Agent state (504 of FIG. 5). In making this transition, the EASS server 616 enters information gleaned from the SAVE ME message 612 into row 632 of the database 618 associated with the EASS server 616. The address from which the message was received can be determined from fields contained within a message header (not shown in FIG. 6B). This address may be the communications address of an individual EASS embedded agent, a combination of the communications address of the client and an internal identification number of the device hosting the EASS embedded agent, or some other unique identifier for the EASS embedded agent that can be mapped to a communications address. The details of the formats of message headers are specific to the particular types of communications mechanisms and implementations. In this example, the addresses are stored as Internet addresses. The stored Internet address is the address of the EASS client running on the PC in which the EASS embedded agent is resident. This address may be enhanced by the EASS server 616 by the addition of characters to the address or subfields within either the address or in the message header to provide sufficient information for the receiving EASS client to identify the particular EASS embedded agent to which the message is addressed. Alternatively, a different address might be established for each EASS embedded agent or an internal address field might be included in each message sent from the EASS server to an EASS client that further specifies the particular EASS embedded agent to which the message is addressed. Thus, receipt of the SAVE ME message has allowed the EASS server 616 to store the address "example@x.com" 632 to identify the EASS embedded agent 602 from which the message was received, to store the current and previous passwords 644 and 646 taken from the received SAVE ME message 612, and to store an indication that the EASS embedded agent 602 is not authorized 648.

Figure 7A:
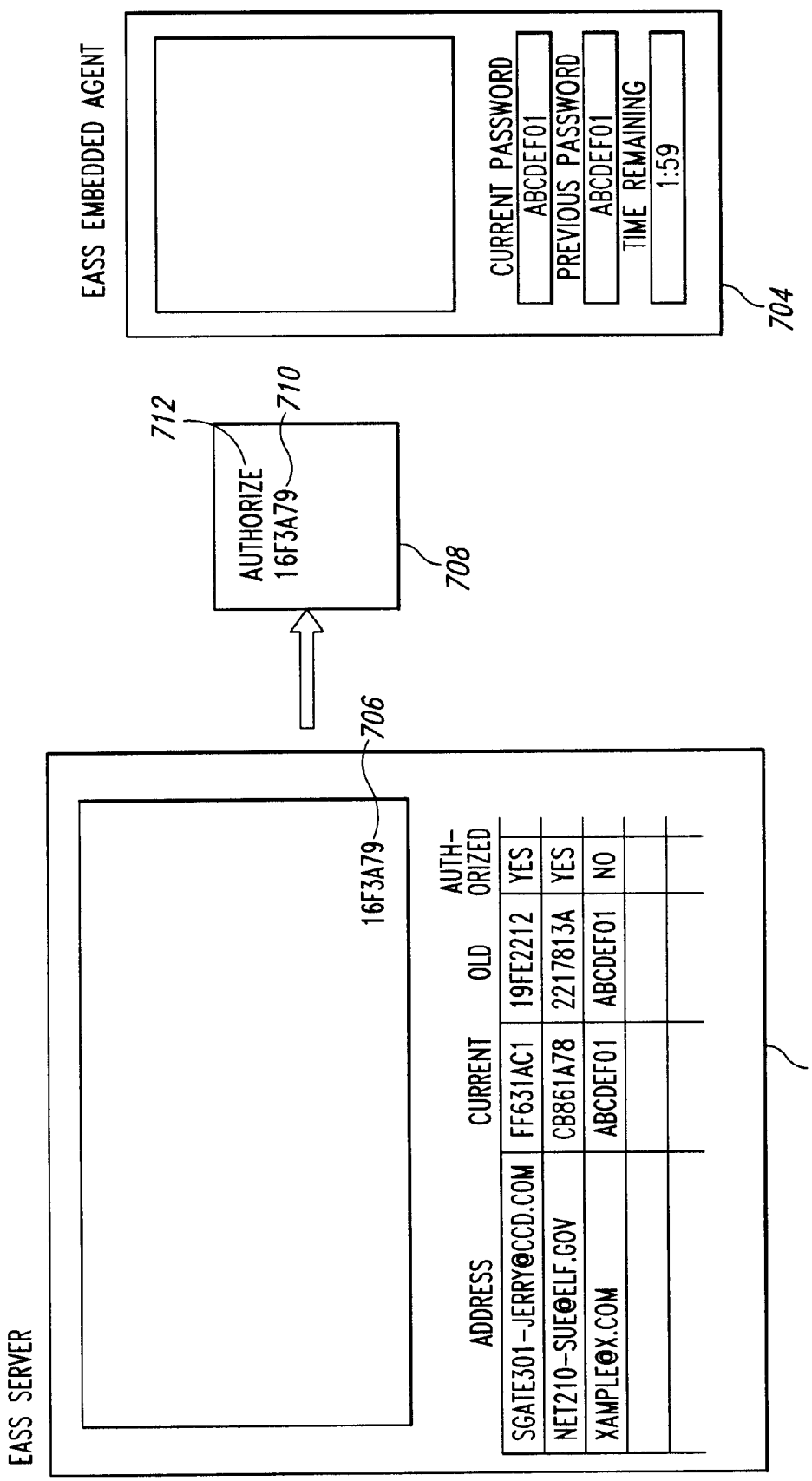
FIGS. 7A–F illustrate the handshake operation that immediately follows receipt by an example EASS server of a SAVE ME message from an example EASS embedded agent in the Initial Power-On Grace Period state.

FIGS. 7A–F illustrate the handshake operation that immediately follows receipt by an example EASS server of a SAVE ME message from an example EASS embedded agent in the Initial Power-On Grace Period state. The handshake operation is initiated, as shown in FIG. 7A, by the EASS server 702. The EASS server 702 generates a new, non-initial password for the EASS embedded agent 704 and stores the new password in volatile memory 706. The EASS server then sends an authorization message 708, for example an "AUTHORIZE" message, to the EASS embedded agent 704 that contains the newly generated password 710 along with an indication 712 that this is an AUTHORIZE message.

Figure 7B:
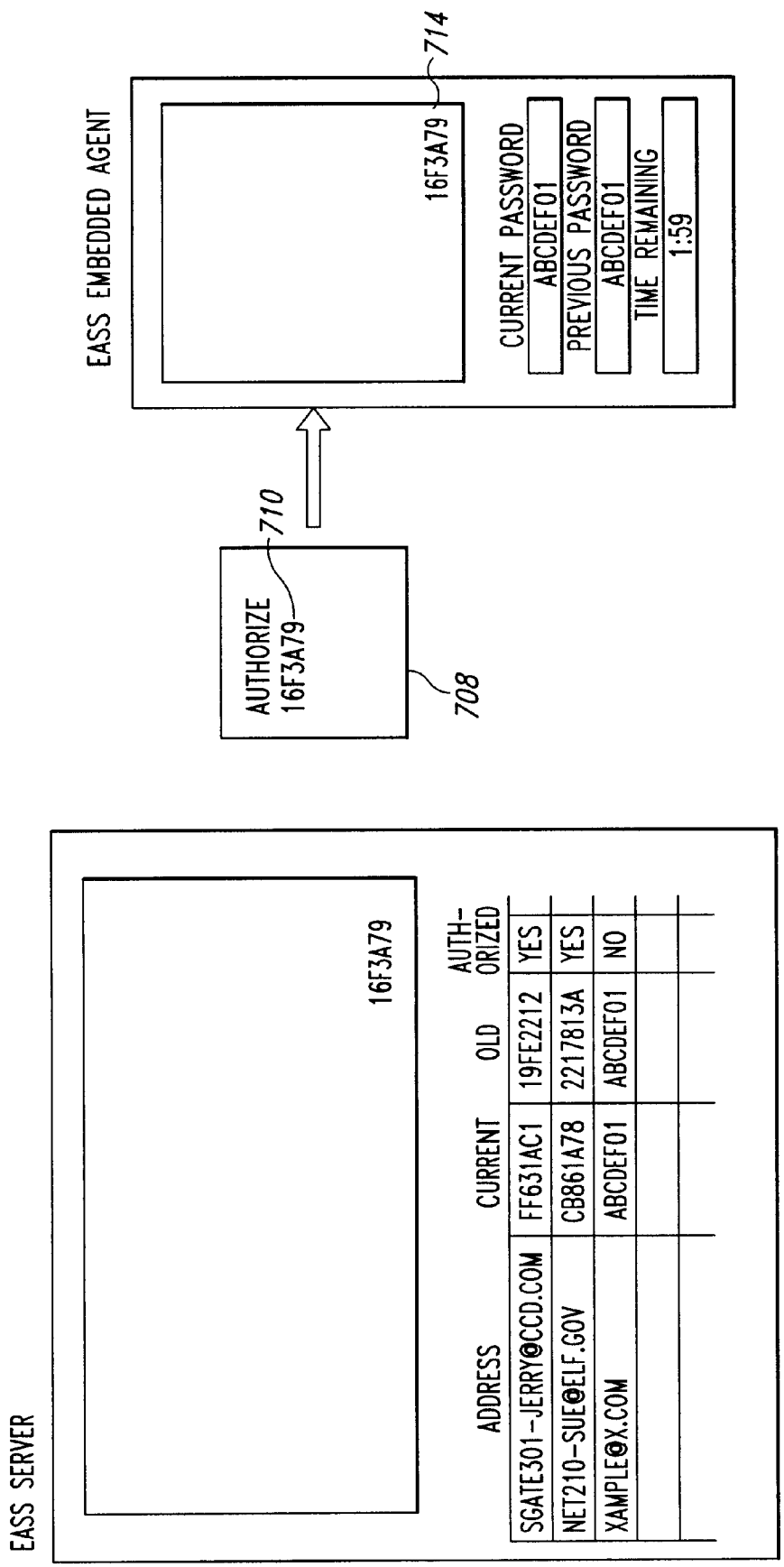

FIG. 7B illustrates receipt of an example AUTHORIZE message by an example EASS embedded agent. The EASS embedded agent 704 stores the newly generated password 710 contained in the AUTHORIZE message 708 into a volatile memory location 714 implemented in the circuitry of the EASS embedded agent 704.

Figure 7C:
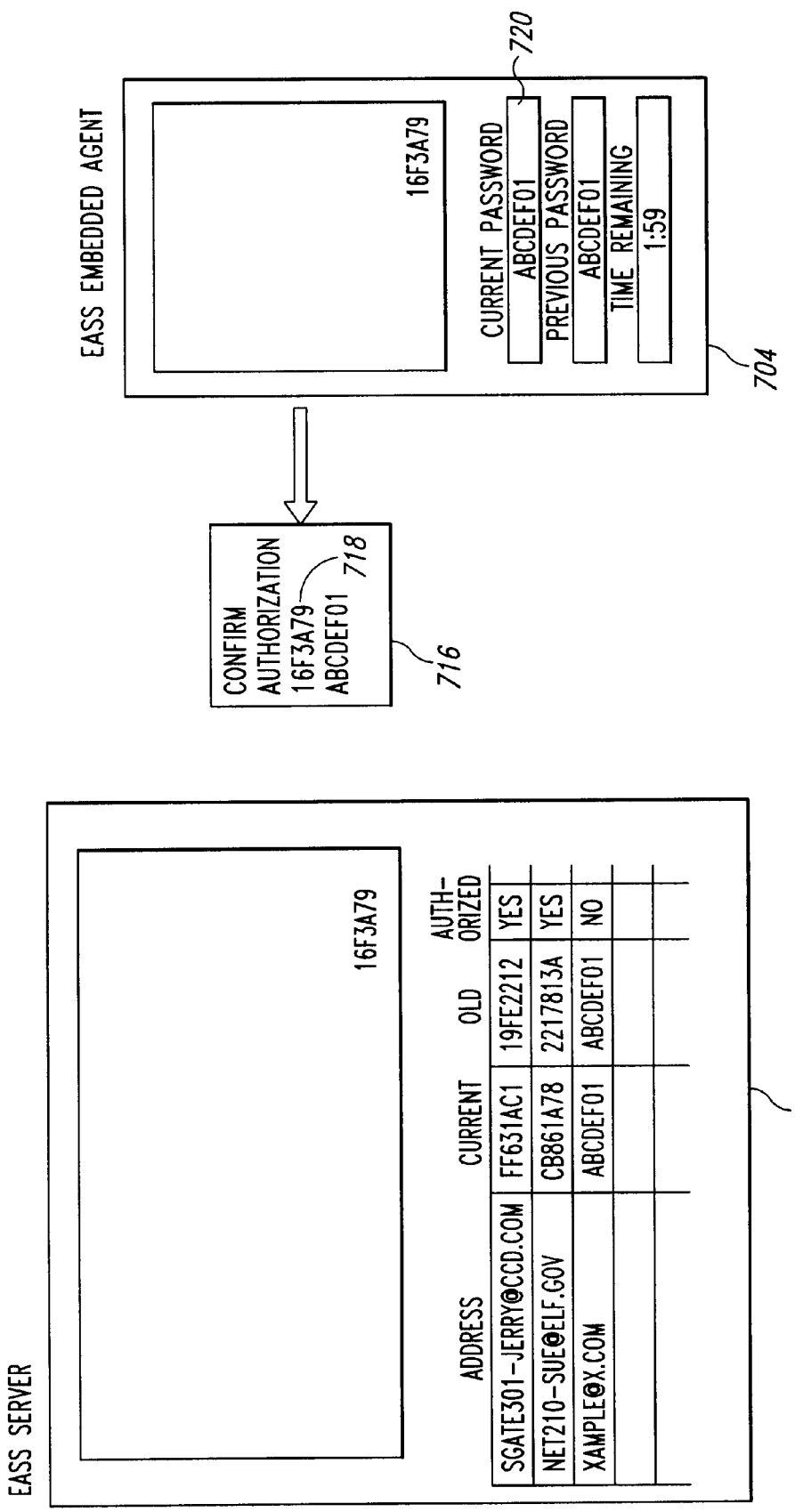

FIG. 7C illustrates sending, by an example EASS embedded agent, of an authorization confirmation message, for example a "CONFIRM AUTHORIZATION" message. The EASS embedded agent 704 sends a CONFIRM AUTHORIZATION message 716 back to the EASS server 702 from which an AUTHORIZE message was received. The CONFIRM AUTHORIZATION message 716 contains the new password sent in the previous AUTHORIZE message by the EASS server 718 as well as the contents of the current password register 720. The CONFIRM AUTHORIZATION message confirms receipt by the EASS embedded agent 704 of the AUTHORIZE message 708.

Figure 7D:
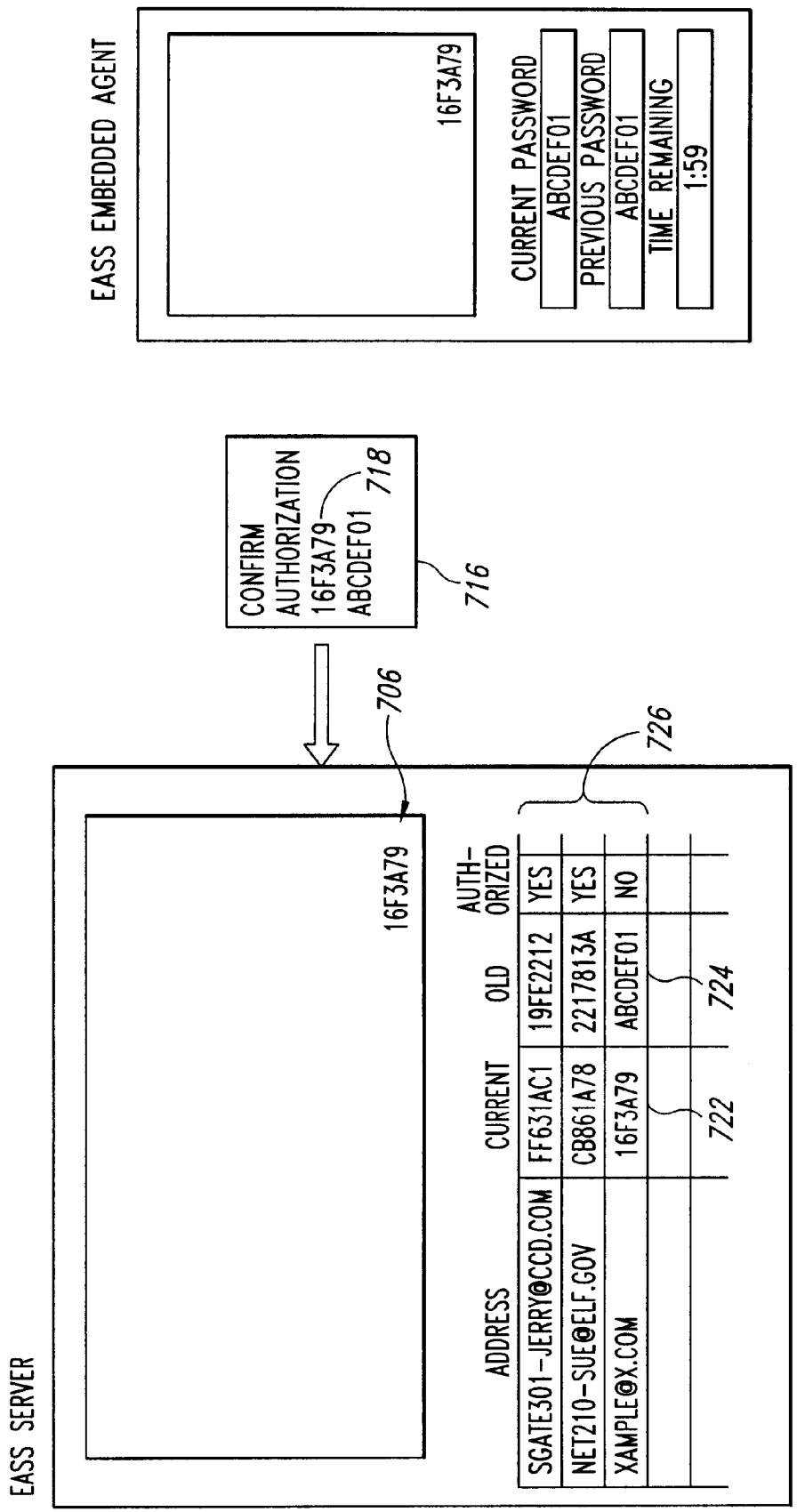

FIG. 7D illustrates receipt of the CONFIRM AUTHORIZATION message 716 by an example EASS server. The EASS server 702 updates the current password and previous password 722 and 724 within the associated database 726 to reflect the contents of the CONFIRM AUTHORIZATION message 716 after checking to make sure that the new password returned in a CONFIRM AUTHORIZATION message is identical to the in-memory copy 706 of the new password. If the new password contained in the CONFIRM AUTHORIZATION message is different from the new password stored in memory 706, then the handshake operation has failed and the EASS server 702 undertakes a new handshake operation with the EASS embedded agent 704.

Figure 7E:
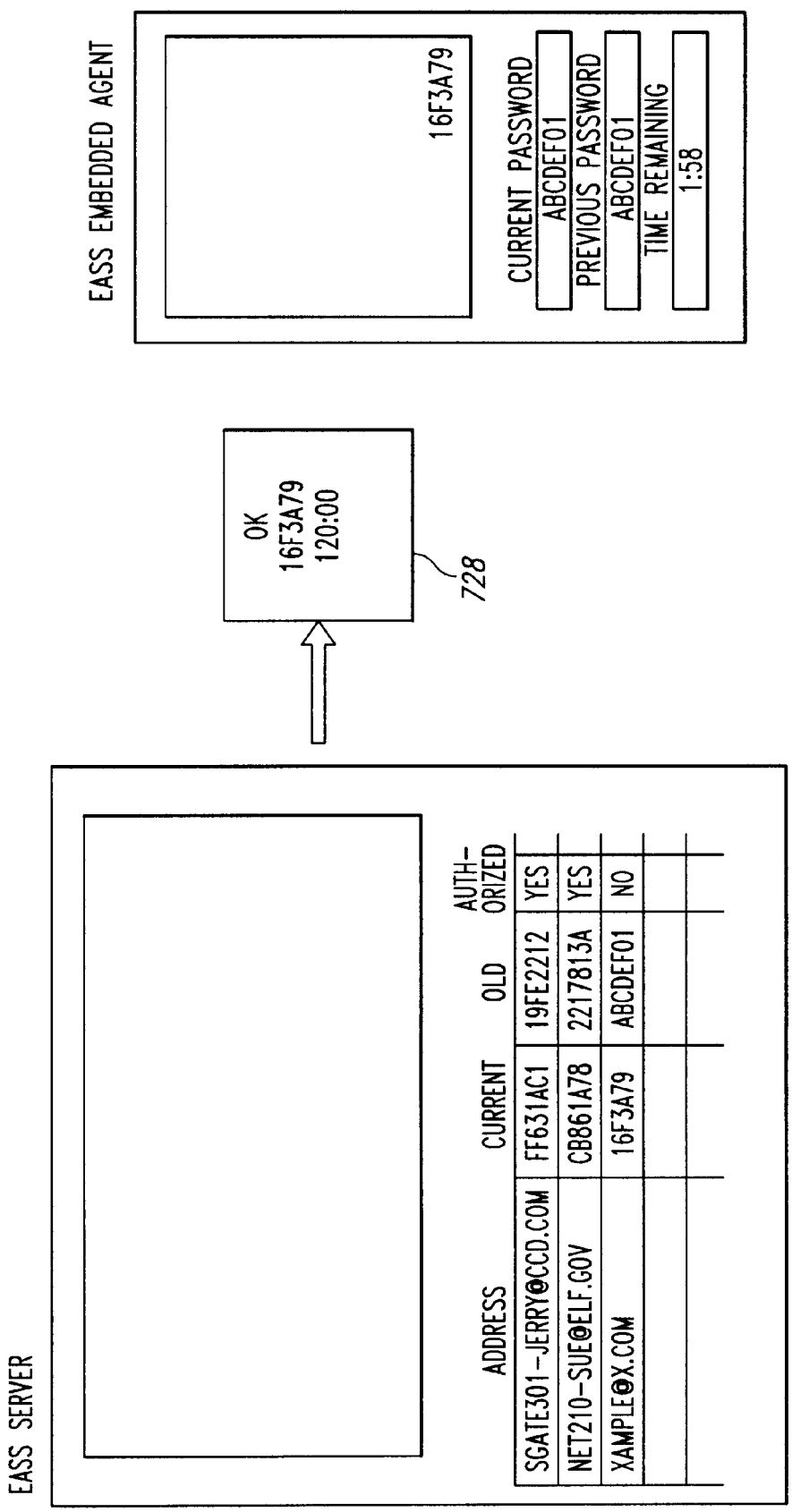

FIG. 7E illustrates sending by the EASS server of a completion message, for example an "OK" message, in response to receipt of the CONFIRM AUTHORIZATION message in order to complete the handshake operation. The EASS server 702 prepares and sends an OK message 728 that contains both the new password and an indication of the time for which the EASS embedded agent 704 will be authorized upon receipt of the OK message.

Figure 7F:
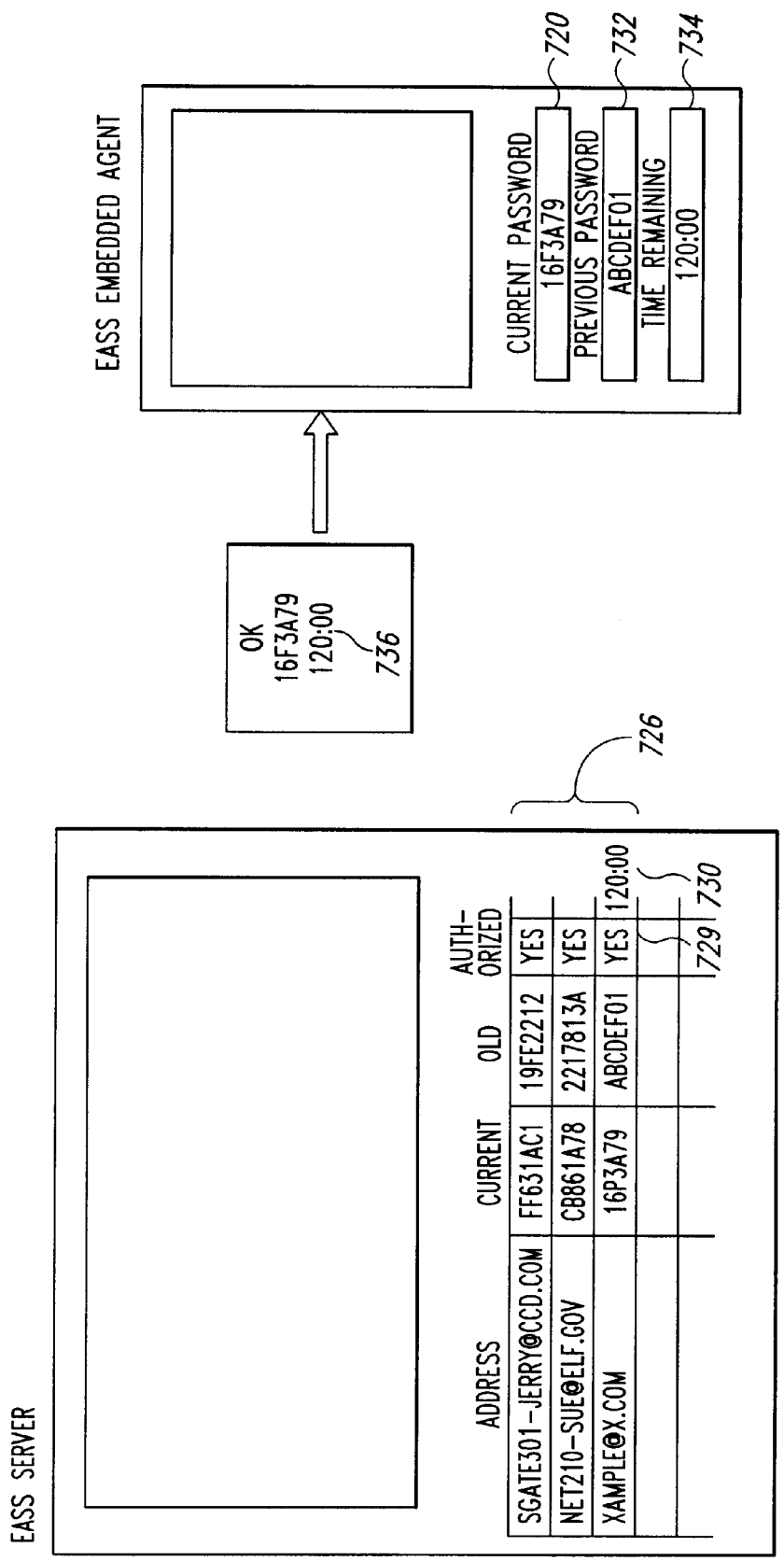

FIG. 7F illustrates receipt of the OK message 728 by an example EASS embedded agent. Once the EASS server 702 has sent the OK message, the EASS server 702 updates the database 726 to indicate that the client is authorized 729 as well as to store an indication of the time 730 for which the EASS embedded agent has been authorized. At this point, the EASS server 702 has transitioned from the Knowledgeable of Agent state (504 in FIG. 5) to the Agent Authorized state (506 in FIG. 5). Upon receipt of the OK message 728, the EASS embedded agent 704 updates the current password register 720 to reflect the new password sent to the EASS embedded agent in the original AUTHORIZE message 708 after placing the contents of the current password register 720 into the previous password register 732. The EASS embedded agent 704 also updates the time remaining register 734 to reflect the authorization time 736 contained in the received OK message. At this point, the EASS embedded agent transitions from the Initial Power-On Grace Period state (402 in FIG. 4) to the Authorized state (406 in FIG. 4).

If the handshake operation fails after sending of the OK message by the EASS server to the EASS embedded agent, but prior to reception of the OK message by the EASS embedded agent, the connection between the EASS embedded agent and the EASS server can be reestablished and authorization reacquired by the sending by the EASS embedded agent of a SAVE ME message to the EASS server. The SAVE ME message will contain, as the current password, the value that the BASS server has stored as the previous password. From this, the EASS server can determine that the previous handshake operation failed, can update the database to reflect the state prior to the failed handshake operation, and can then reinitiate a new handshake operation.

FIGS. 8A–F illustrate a second handshake operation that follows the original handshake operation by some period of time less than the original authorization period. By undertaking additional handshake operations, the EASS server 801 continues to initiate handshake operations to maintain the EASS embedded agent 805 in the Authorized state (406 in FIG. 4). The EASS server 801 generates a new, non-initial password 802 and sends this password in an AUTHORIZE message 804. The EASS embedded agent receives the AUTHORIZE message 804 and stores the newly generated password in memory 806. The EASS embedded agent 805 then sends a CONFIRM AUTHORIZATION message 808 back to the EASS server 801 containing both the newly generated password 810 and the contents of the current password register 812. Upon receipt of the CONFIRM AUTHORIZATION message 808, the EASS server 801 updates the database entries for the current and previous passwords 814 and 816 and then sends an OK message 818 back to the EASS embedded agent 805 that contains the new password and the new time period 809 for which the EASS embedded agent 805 will be authorized. After sending the OK message 818, the EASS server 801 updates the database to reflect the new time of authorization 820 and, upon receipt of the OK message by the embedded agent, the non-volatile registers of the EASS embedded agent are updated to reflect the new current password and the now previous password, 822 and 824, respectively.

Figure 8A:
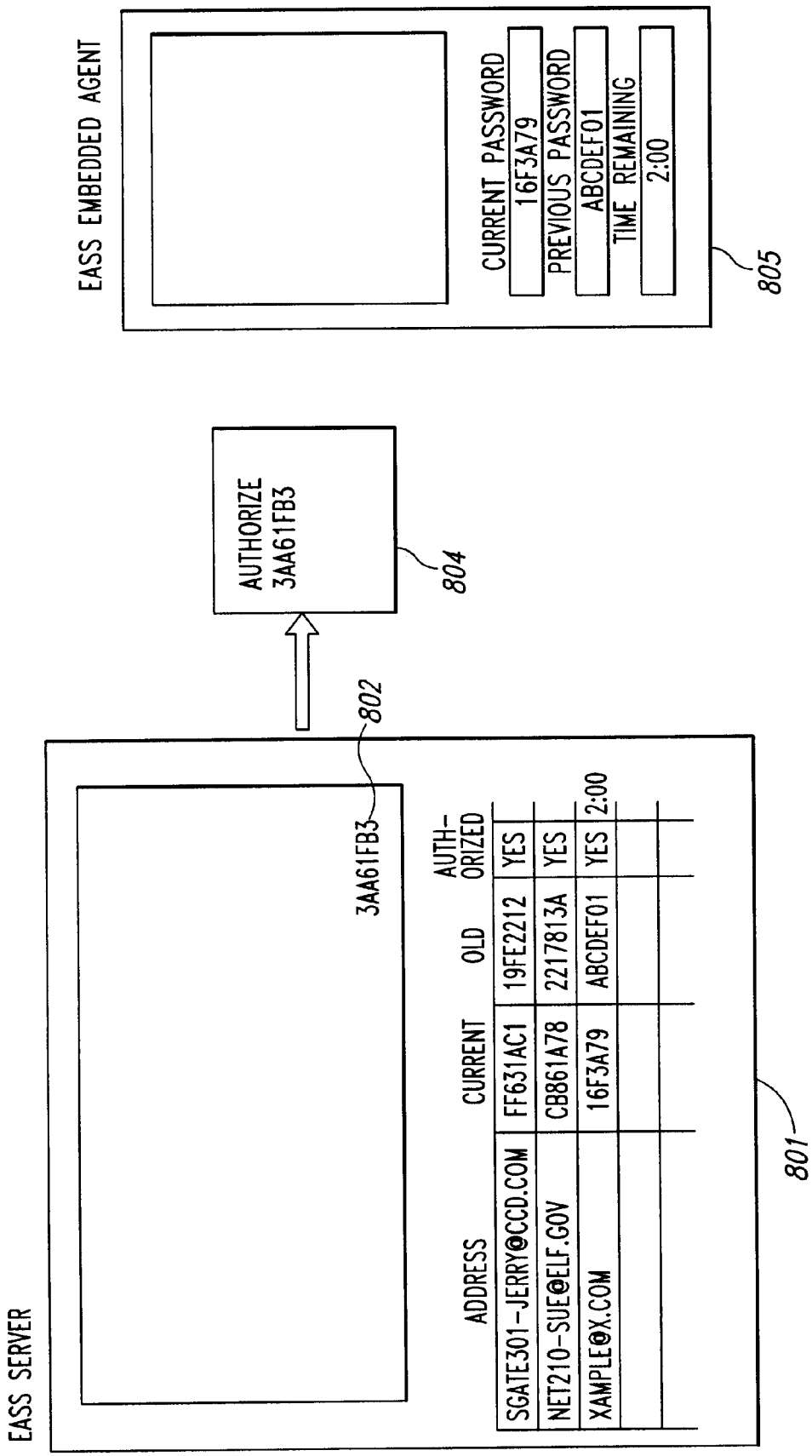
FIGS. 8A–F illustrate a second example handshake operation that follows the original handshake operation of FIGS. 7A–F by some period of time less than the original authorization period.
Figure 8B:
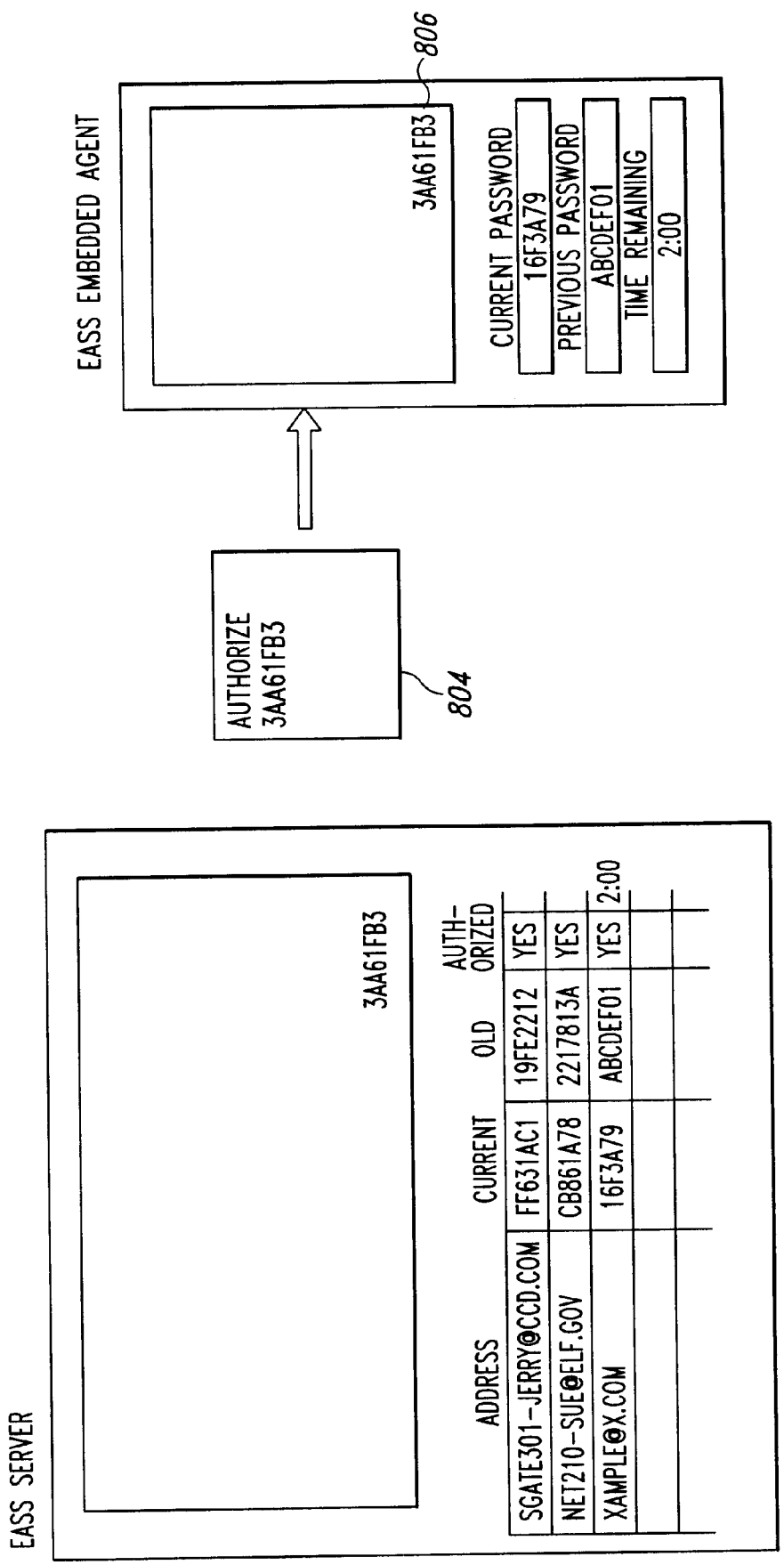
Figure 8C:
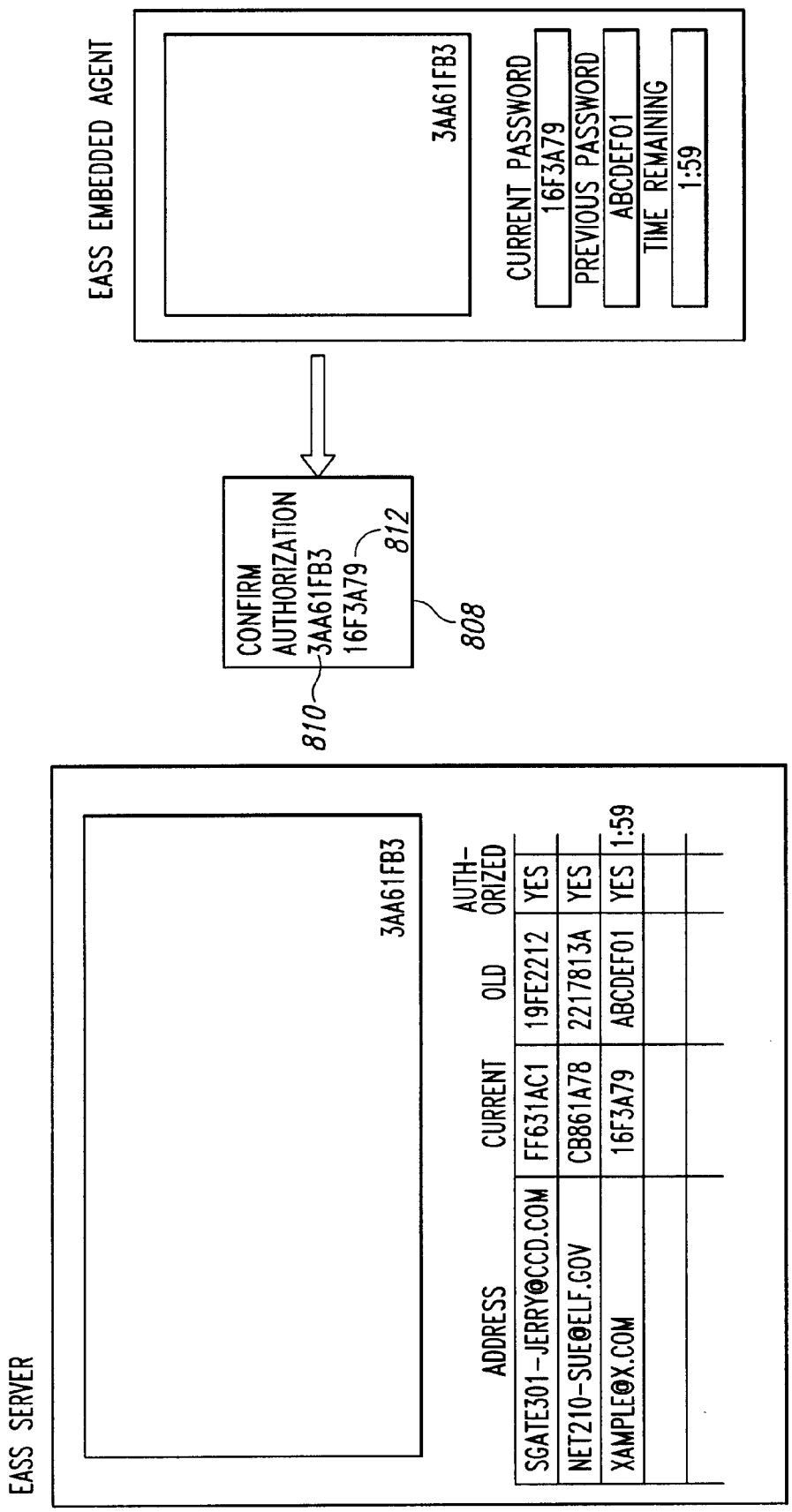
Figure 8D:
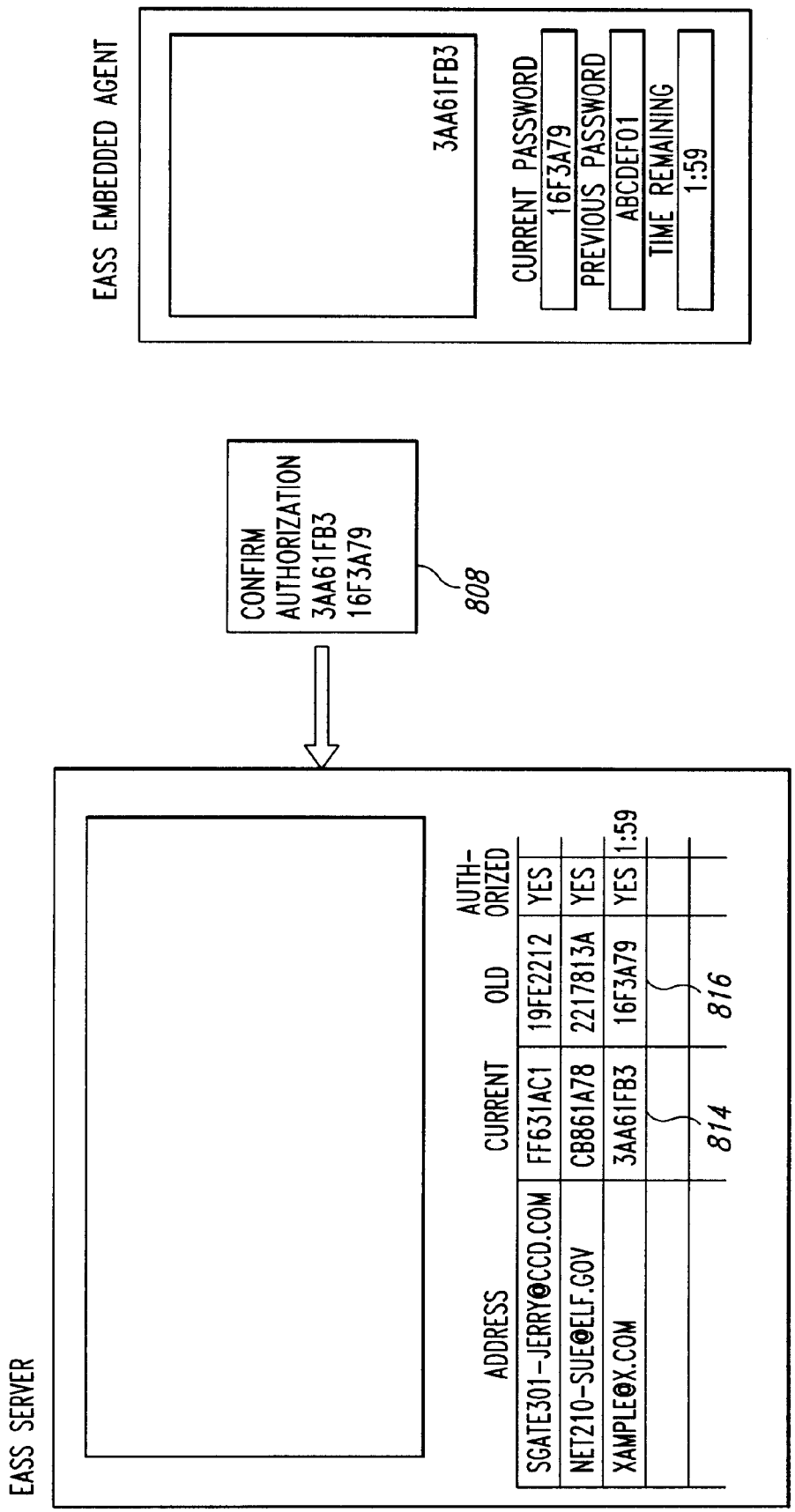
Figure 8E:
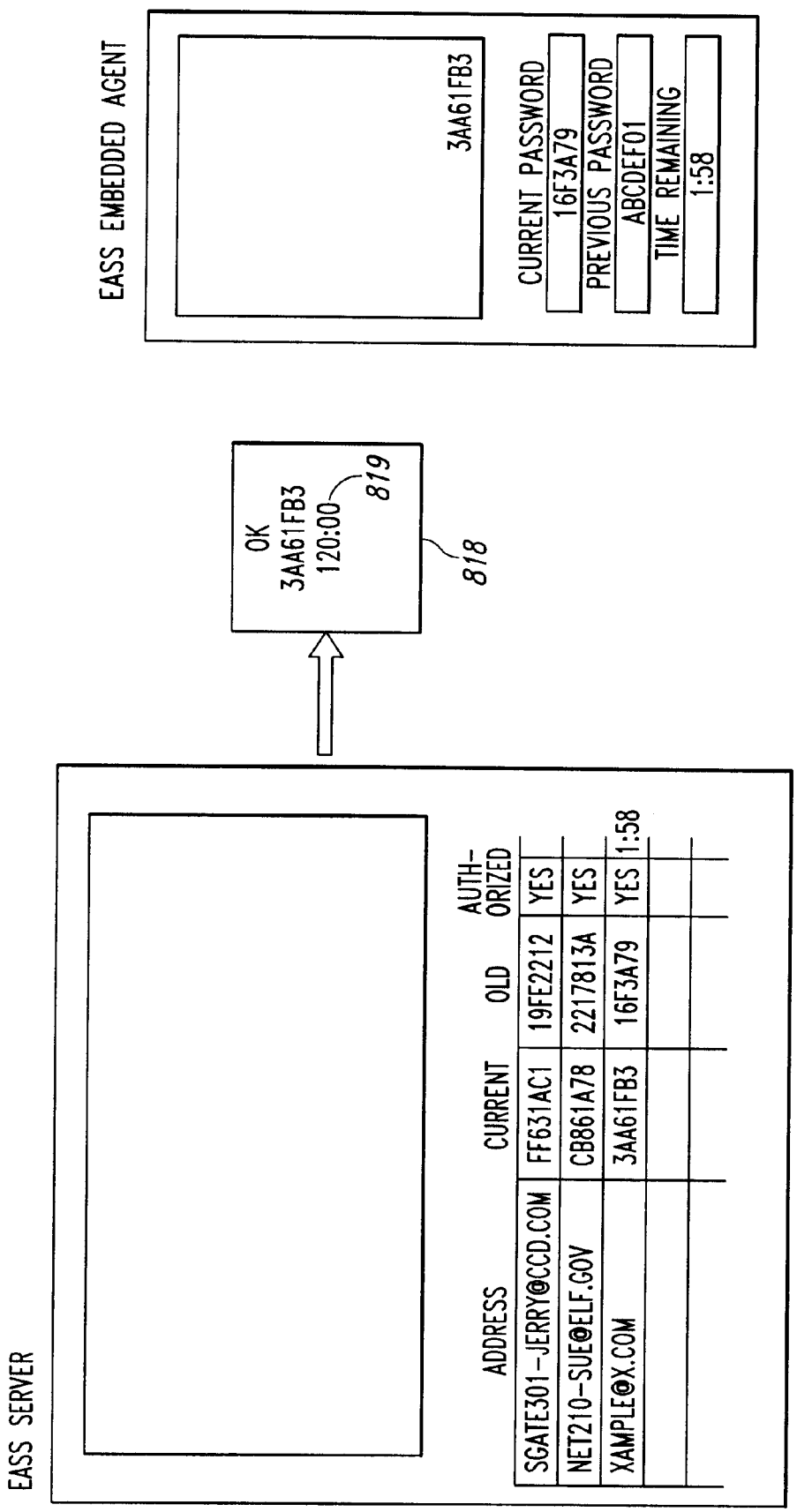
Figure 8F:
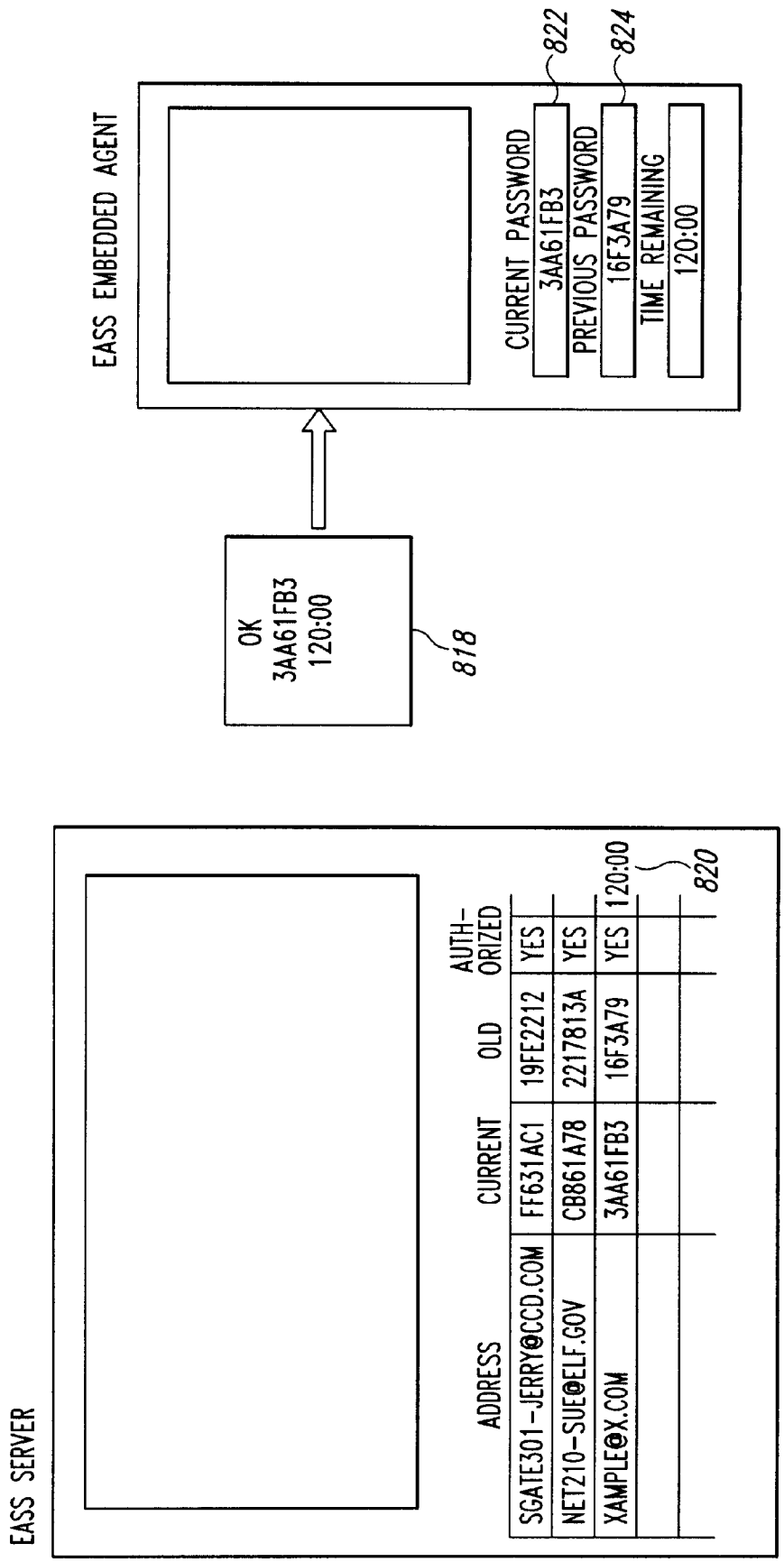
Figure 9A:
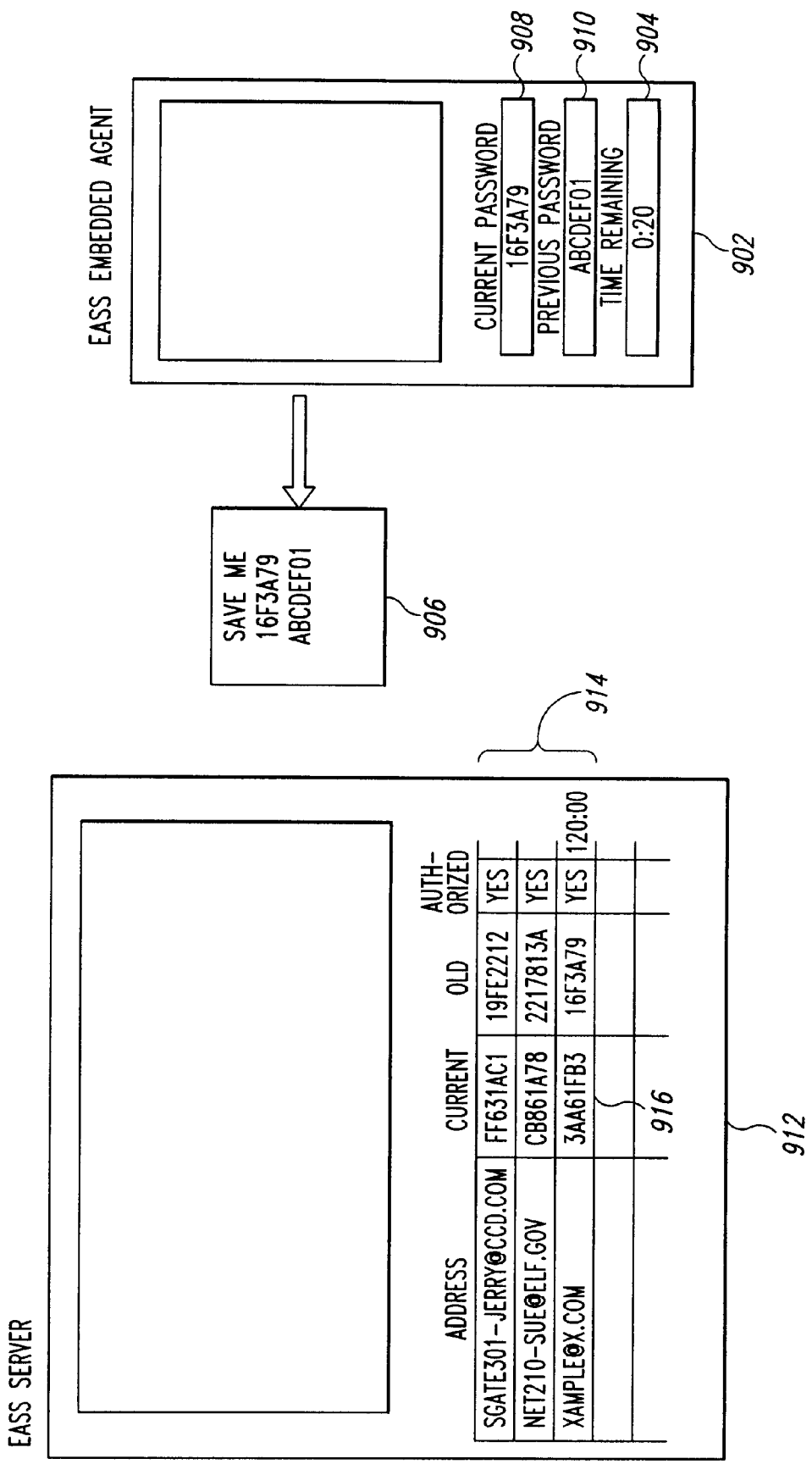
FIGS. 9A–B illustrate the recovery mechanism that is employed by an example EASS embedded agent in the event that the OK message of FIGS. 8E–F was lost and not received by the EASS embedded agent.
Figure 9B:
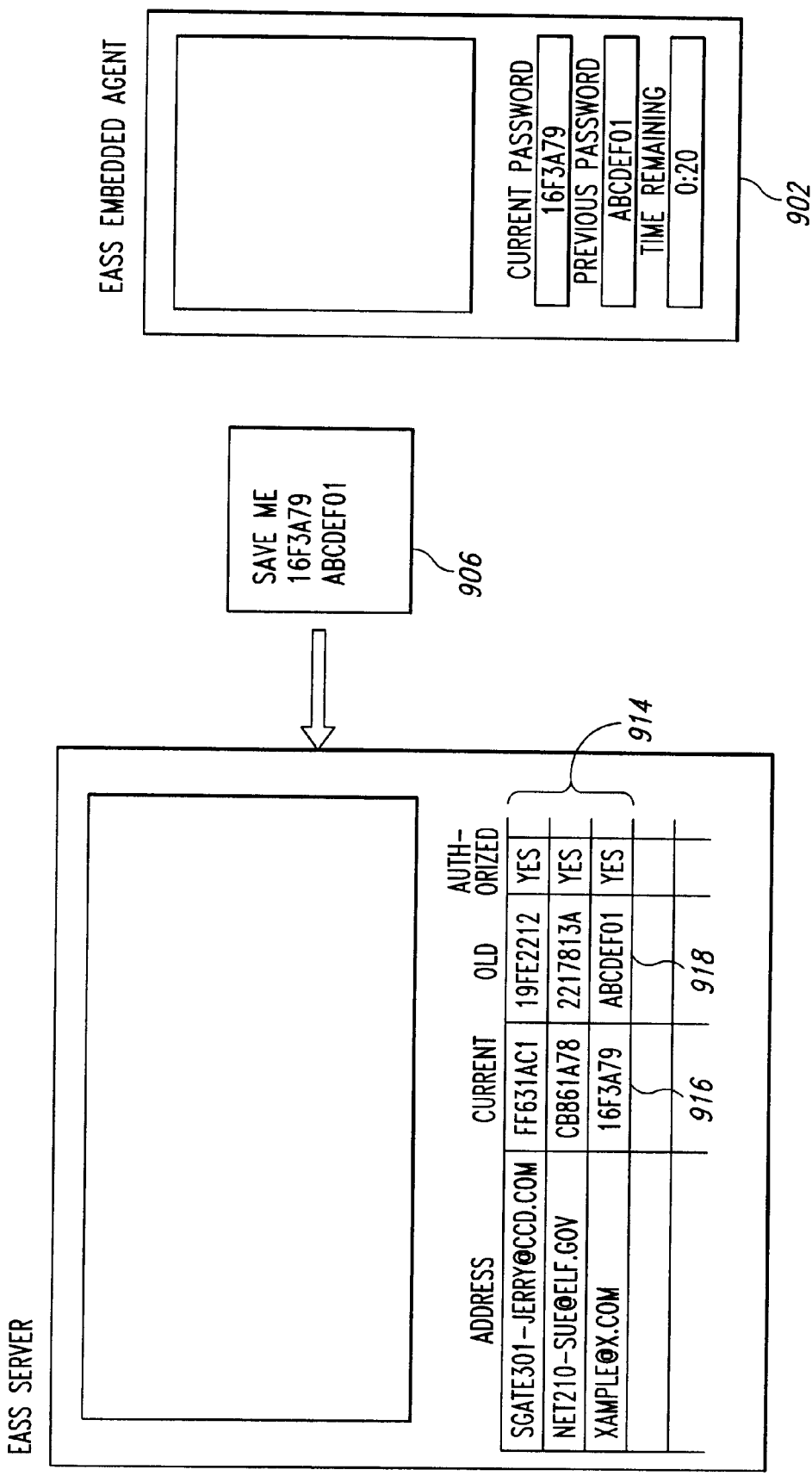

FIGS. 9A–B illustrate the recovery mechanism that is employed by an example EASS embedded agent in the event that the OK message of FIGS. 8E–F was lost and not received by the EASS embedded agent. In this case, the time remaining continues to decrease and the EASS embedded agent 902 determines from the time remaining register 904 that sending of a SAVE ME message 906 is necessary to initiate another handshake operation. Because the final OK message 818 is not received by the EASS embedded agent 902, the values of the current password register 908 and the previous password register 910 have not been updated and are the same as the values that were established as a result of the first authorization, as shown in FIG. 7F. However, the EASS server 912 has updated its internal database 914 to indicate the new password generated during the previous handshake operation 916. Thus, the EASS server database 914 does not reflect the actual state of the EASS embedded agent 902. However, when the EASS server 912 receives the SAVE ME message 906, the EASS server 912 can immediately determine that the previous handshake operation did not successfully complete and can update the current password entry and the previous password entry 916 and 918 in the associated database 914 to reflect the actual current state of the EASS embedded agent 902. Thus, upon receipt of the SAVE ME message, the EASS server and the EASS embedded agent are again synchronized, and the EASS server can initiate a new handshake operation to reauthorize the EASS embedded agent.

The above-illustrated and above-described state diagrams and message passing details represent one of many possible different embodiments of the present invention. A different communications protocol with different attendant state diagrams and messages can be devised to accomplish the authorization of EASS embedded agents by EASS servers. Depending on the communications pathways employed, different types of messages with different types of fields and different types of header information may be employed. Moreover, the EASS embedded agent may contain additional non-volatile registers and may maintain different values within the associated non-volatile registers. As one example, rather than passing passwords, both the EASS server and each EASS embedded agent may contain linear feedback registers that electronically generate passwords from seed values. The communications protocols between the EASS server and the EASS embedded agents could ensure that, during transition from the Initial Power-On Grace Period state, the EASS embedded agent receives an initial seed for its linear feedback register that is also used by the EASS server for the EASS server's linear feedback register. Rather than passing passwords, both the EASS embedded agents and the EASS servers can depend on deterministic transitions of their respective linear feedback registers to generate new, synchronized passwords at each authorization point.

A clever thief who has stolen a PC, who has managed to discern the need to establish connections between EASS embedded agents and an EASS server, and who possesses the necessary passwords to gain entry to client and server utilities that enable a connection between an EASS client and an EASS server to be initialized, will still fail to overcome the EASS and may, in fact, broadcast the location and use of the stolen PC to the EASS. A different EASS server to which a connection is attempted will immediately detect the attempt by the thief to connect the stolen PC to the EASS server by detecting non-initial passwords in the SAVE ME message sent by the EASS embedded agent in order to solicit a handshake operation. The reconnection attempt will be readily discernible to a security administrator using utilities provided to display database contents on the EASS server. Connection to a different EASS server will fail because the EASS embedded agents will power up to the Power-On Grace Period state, rather than the Initial Power-On Grace Period state. The passwords sent to the different EASS server will therefore not be identified as initial passwords. The different EASS server may then notify a centralized management or administrative facility of the fraudulent attempt to connect along with the network address from which the attempt was made. An attempt to connect to the same EASS server will also fail, because the address of the EASS embedded agents within the PC will have changed.

Pseudo-Code Implementation

A pseudo-code example implementation of an example EASS server and EASS embedded agent is given below. Although the EASS embedded agent will normally be implemented as a logic circuit, that logic circuit will implement in hardware the algorithm expressed below as pseudo-code. Software and firmware implementations of the EASS embedded agent may, in addition, represent alternate embodiments of the present invention.

```
1    enum MSG_TYPE {AUTHORIZE, CONFIRM_AUTHORIZE, OK, SAVE_ME, DEVICE};
2
3    enum ERRORS {QUEUED_AND_SAVE_ME, MULTIPLE_OKS_LOST ALARM,
4                 CONFIRM_AUTHORIZE_SYNC, NO_ENTRY, QUEUE_ERROR};
5
6    type PASSWORD;
7    type ADDRESS;
8    type TIME;
9
10   const TIME initGrace = 2:00;
11   const TIME saveMe = 0:20;
12
13   class Error
14   {
15        Error (int err, ADDRESS add);
16   }
17
18   class DeviceMessage
19   {
20        Device Message ( );
21   }
22
23   class Device
24   {
25        Device ( );
26        Void    enable ( );
27        Void    disable ( );
28        Void    send (Device Message & dvmsg);
29        Bool    receive (Device Message & dvmsg);
30   }
31
32   class Timer
33   {
34        timer (TIME t);
35        void set (TIME t);
36   }
37
38   class TimerInterrupt
39 {
40        TimerInterrupt ( );
41   }
42
43   class TimeServer
44   {
45        TimeServer ( );
46        TIME nextAuthorizationPeriod (Address add);
47   }
48
49   class Messages
50   {
```

-continued

```
51              Messages( );
52              Bool     getNext ( );
53              MSG_TYPE    getType ( );
54              PASSWORD    getNewPassword ( );
55              PASSWORD    getCurrentPassword ( );
56              PASSWORD    getPreviousPassword ( );
57              TIME    getTime ( );
58              ADDRESS     getAddress ( );
59              Bool    sendAuthorize (PASSWORD npwd, ADDRESS add);
60              Bool    sendConfirmAuthorize (PASSWORD npwd, PASSWORD cpwd, ADDRESS add);
61              Bool    sendOK (Time t, PASSWORD npwd, ADDRESS add);
62              Bool    sendSaveMe (PASSWORD cpwd, PASSWORD ppwd, ADDRESS add);
63      }
64
65      class AgentMessages:Messages
66      {
67              DeviceMessage & getDeviceMsg ( );
68              Bool sendDeviceMsg (DeviceMessage & msg);
69      }
70
71      class Passwords
72      {
73              Passwords ( );
74              Bool    initialPassword (PASSWORD pwd);
75              PASSWORD    generateNewPassword ( );
76              void    queue(ADDRESS add, PASSWORD npwd, PASSWORD ppwd);
77              Bool    dequeue (ADDRESS add, PASSWORD & npwd, PASSWORD & ppwd);
78      }
79
80      class Database
81      {
82              Database( );
83              Bool    newAgent (ADDRESS add, PASSWORD cur, PASSWORD prev, Bod authorized,Time t);
84              Bool    updateAgent (ADDRESS add, PASSWORD cur, PASSWORD prev, Bool authorized, Time t);
85              Bool    retrieveAgent (ADDRESS add, PASSWORD & cur, PASSWORD & prev, Bool & Authorized,
86                                  TIME & t);
87              Bool    deleteAgent (ADDRESS add);
88      }
89
90      agent (PASSWORD current, PASSWORD previous)
91      {
92              PASSWORD tpwd;
93              Timer time (init, Grace);
94              AgentMessages msg ( );
95              Device dv ( );
96              DeviceMessage dvmsg ( );
97              Bool authorized = FALSE;
98              Bool enabled = TRUE;
99
100                 do
101                 {
102                     try
103                     {
104                         while (msg.getNext ( ))
105                         {
106                             switch (msg.getType ( ))
107                             {
108                                 case AUTHORIZE:
109                                     tpwd = msg.getNewPassword ( );
110                                     msg.sendConfirmAuthorize    (tpwd, current, msg.getAddress ( ));
111                                     break;
112                                 caseOK:
113                                     if (tpwd == msg.getNewPassword ( ))
114                                     {
115                                         time.set (msg.getTime ( ) - saveMe);
116                                         authorized = TRUE;
117                                         previous = current;
118                                         current = tpwd;
119                                         if (!enabled)
120                                         {
121                                             dv.enable ( );
122                                             enabled = TRUE;
123                                         }
124                                     }
125                                     break;
126                                 caseDEVICE:
127                                     if (enabled) dv.send (msg.getDeviceMsg ( ));
128                                     break;
129                                 default;
```

-continued

```
130                         break;
131                     }
132                 }
133             while (dv.receive (dvmsg))
134             {
135                 if (enabled) msg.sendDeviceMsg (dvmsg);
136             }
137         }
138         catch (TimerInterrupt)
139         {
140             if (authorized)
141             {
142                 authorized = FALSE;
143                 msg.sendSaveMe (current, previous, msg.getAddress ( ));
144                 time.set (saveMe);
145             }
146             else
147             {
148    enabled = FALSE;
149    msg.sendSaveMe(current, previous, msg.getAddress ( ));
150    time.set(SaveMe);
151    dv.disable ( );
152             }
153         }
154     }
155 }
156
157 server( )
158 {
159         Messages msg( );
160         PASSWORD current, previous, dcur, dprev, newp;
161         PASSWORD       queuedNew, queuedCurrent, newpass;
162         Passwords      pwds ( );
163         TIME      t;
164         Database  db ( );
165         ADDRESS       add;
166         TimeServer ts ( );
167         Bool      auth;
168
169         while (msg.getNext ( ))
170         {
171             switch (msg.getType ( ))
172             {
173                 caseSAVE_ME:
174                     current = msg.getCurrentPassword ( );
175                     previous = msg.getPreviousPassword ( );
176                     if (pswds.dequeue(msg.getAddress ( ), queuedNew, queuedCurrent))
177                     {
178                         if (queuedCurrent == current)
179                         {
180                             newp = pswds.generateNewPassword ( );
181                             pswds.queue(msg.getAddress ( ), newp, current);
182                             msg.sendAuthorize(newp, msg.getAddress ( ));
183                         }
184                         else throw (Error (QUEUED_AND_SAVE_ME, msg.getAddress ( ));
185                     }
186                     else
187                     {
188                         if (pswds.initialPassword(current) && pswds.initialPassword
189                             (previous))
190                         {
191                             db.deleteAgent (msg.getAddress ( ));
192                             newp = pswds.generateNewPassword ( );
193                             pswds.queue (msg.getAddress( ), newp, current);
194                             msg.sendAuthorize(newp, msg.getAddress ( ));
195                         }
196                         else
197                         {
198                             if (db.retrieveAgent (msg.getAddress ( ), dcur, dprev, auth,tm)
199                             {
200                                 if (dcur == current && tm >= getSystemTime ( ))
201                                 {
202                                     newp=pswds.generateNewPassword ( );
203                                     pswds.queue(msg.getAddress ( ), newp, current)
204                                     msg.sendAuthorize(newp, msg.getAddress ( ));
205                                 }
206                                 else if (dprev == current && tm >= getSystemTime ( ))
207                                 {
208                                     msg.sendOK (ts.nextAuthorizationPeriod(msg.getAddress ( ),
```

```
                                    dcur, msg.getAddress ( ));
209
210                             }
211                             else if (dprev == current && tm < getSystemTime ( ))
212                             {
213                                 throw (Error (MULTIPLE_OKS_LOST, msg.getAddress ( ));
214                             }
215                             else throw (Error (ALARM, msg.getAddress ( ));
216                         }
217                         else throw (Error (ALARM, msg.getAddress ( ));
218                     }
219                 }
220             case CONFIRM_AUTHORIZE:
221                 newpass = msg.getNewPassword ( ),
222                 current = msg.getCurrentPassword ( );
223                 if(paswds.dequeue (msg.getAddress ( ), queuedNew, queuedCurrent))
224                 {
225                     if(newpass == queuedNew && current == queuedCurrent)
226                     {
227                         if (db,retrieveAgent(msg.getAddress ( ), dcur,dprev,auth,tm))
228                         {
229                             if (dcur == current)
230                             {
231                                 tm = ts.nextAuthonzationPeriod(msg.getAddress ( ));
232                                 db.updateAgent(msg.getAddress ( ),newpass,current,
233                                     tm + getSystemTime ( ));
234                                 msg.SendOK (tm, newpass, msg.getAddress ( ));
235                             }
236                             else
237                             {
238                                 throw (Error (CONFIRM_AUTHORIZE_SYNC,
239                                     msg.getAddress ( ));
240                             }
241                         }
242                         else
243                         {
244                             if(pswds.initialPassword (current))
245                             {
246                                 tm - ts.nextAuthorizationPeriod (msg.getAddress ( ));
247                                 db.newAgent(msg.getAddress ( ),newpass,current,
248                                     tm + getsystemTime ( ));
249                                 msg.sendOK(tm, newpass, msg.getAddress ( ));
250                             }
251                             else throw(Error(NO_ENTRY, msg.getAddress ( )));
252                         }
253                     }
254                     else throw (Error (QUEUE_ERROR, msg.getAddress( )));
255                 }
256                 else throw (Error (ALARM, msg.getAddress ( ));
257                 break;
258             default;
259                 break;
260             }
261         }
262     }
```

Lines 1–11 of the above program include definitions of constants and types used in the remaining lines of the program. Line 1 defines the enumeration MSG_TYPE that includes five enumerated constants to describe the five different types of messages used to implement the EASS. These types of messages include the AUTHORIZE, CONFIRM AUTHORIZE, OK, and SAVE ME messages described in FIGS. 6A–B and 7A–F, as well as DEVICE messages which are exchanged between the CPU (214 in FIG. 2) and the device controllers (242, 244, 246, 248, and 250 in FIG. 2) via the system controller (218 in FIG. 2) and via any EASS embedded agents residing in the device controllers. On lines 3 and 4, an enumeration is declared for various types of errors and potentially insecure conditions that may arise during operation of both the EASS server and EASS embedded agents. These errors and conditions will be described below in the contexts within which they arise. On lines 6–8, three basic types used throughout the implementation are declared. These types may be implemented either using predefined types, such as integers and floating point numbers, or may be more elaborately defined in terms of classes. These types include: (1) PASSWORD, a consecutive number of bits large enough to express internal passwords used within the EASS, commonly 56, 64, or 128 bits; (2) ADDRESS, a number of consecutive bits large enough to hold communications addresses for EASS servers and EASS embedded agents; and (3) TIME, a time value expressed in hours, minutes and seconds, possibly also including a date and year. On lines 10 and 11, the constants "interface" and "saveMe" are defined to be two minutes and 20 seconds, respectively. The constant "interface" is the initial grace period following power up during which an EASS embedded agent passes device messages to and from the device controller into which it is embedded without authorization. The constant "saveMe" is the interval at which an EASS embedded agent sends SAVE ME messages to an EASS server in order to reestablish authorization. In an alternative embodiment, both the initial grace period and the SAVE ME interval may be configurable by a user, by the EASS server, by an administrator, or by some combination of users, EASS servers, and administrators.

On lines 13–88, a number of classes are declared that are used in the routines "agent" and "server" that follow. Prototypes for these classes are given, but the implementations of the methods are not shown. These implementations are quite dependent on the specific computer hardware platforms, operating systems, and communications protocols employed to implement the EASS. Much of the implementations of certain of these classes may be directly provided through operating system calls. The class Error, declared on lines 13–16, is a simple error reporting class used in the server routine for exception handling. Only the constructor for this class is shown on line 15. An instance of this class is initialized through the arguments passed to the constructor. These include an integer value representing the particular error that has been identified and an address value that indicates the network or communications address of the EASS embedded agent that the error relates to.

The class DeviceMessage, declared on lines 18–21, encapsulates methods and data that implement the various kinds of device messages exchanged between the CPU and the device controllers of a PC. The methods and data for this class depend on the types of communications buses employed within the PC and are, therefore, not further specified in this example program. The class Device, declared on lines 23–30, represents the functionality of the device controller within which an EASS embedded agent is embedded. In general, the methods shown for this class would be implemented as hardware logic circuits. The methods include optional methods for enabling and disabling the device declared on lines 26 and 27, a method for sending device messages to the device, declared on line 28, and a method for receiving device messages from the device, declared on line 29.

The class Timer, declared on lines 32–36, is an asynchronous timer used in the agent routine. An asynchronous timer can be initialed for some time period either through the constructor, declared on line 34, or through the method "set," declared on line 35. If the time period is not reinitialized before the timer expires, the asynchronous timer throws an exception or, when implemented in hardware, raises a signal or causes an interrupt that may then be handled either by the agent routine or the logic circuit that implements the agent routine. The class TimerInterrupt, declared on lines 38–41, is essentially a place holder class used in the exception handling mechanism to indicate expiration of a timer. The class TimeServer, declared on lines 43–47, is a class used by the server routine for determining the next authorization period for a particular EASS embedded agent. The method "nextAuthorizationPeriod," declared on line 46, takes the network or communications address of an EASS embedded agent as an argument and returns a time period for which the EASS embedded agent will be next authorized. This authorization period may, in some implementations, be a constant or, in other implementations, the authorization period may be calculated from various considerations, including the identity of the particular EASS embedded agent or the previous authorization history for the EASS embedded agent.

The class Messages, declared on lines 49–63, is a generalized communications class that allows an EASS server to exchange messages with EASS embedded agents. The method "getNext," declared on line 52, instructs an instance of the Messages class to return a Boolean value indicating whether there are more messages queued for reception. If so, getNext makes that next message the current message from which information can be obtained by calling the methods declared on lines 53–58. These methods allow for obtaining the type of the message, the address of the sender of the message, and the contents of the message, depending on the type of the message, including new passwords, current passwords, previous passwords, and authorization times. The methods "sendauthorize" and "sendOK" declared on lines 59 and 61 are used in the server routine to send AUTHORIZE and OK messages to EASS embedded agents, respectively. The methods "sendConfirmAuthorize" and "sendSaveMe" declared on lines 60 and 62 are used in the agent routine to send CONFIRM AUTHORIZE and SAVE ME messages to an EASS server, respectively. The class "AgentMessages," declared on lines 65–69, derived from the class "Messages," allows an EASS embedded agent to communicate both with an EASS server as well as with the CPU. In other words, the two methods "getDeviceMsg" and "sendDeviceMsg," declared on lines 67–68, allow an EASS embedded agent to intercept device messages sent by the CPU to the device controller in which the EASS embedded agent is embedded and to pass device messages from the device controller back to the CPU.

The class Passwords, declared on lines 71–78, is used within the server routine for queuing certain password information as well as for generating passwords and determining whether a password is an initial password. The method "initialPassword," declared on line 74, takes a password as an argument and returns a Boolean value indicating whether the password is an initial password or not. The method "generateNewPassword," declared on lines 75, generates a new, non-initial password to pass to an EASS embedded agent as part of an AUTHORIZE message. A more sophisticated implementation of generateNewPassword might use an input argument that identifies a particular EASS embedded agent for generating new passwords specific to particular EASS embedded agents. The methods "queue" and "dequeue," declared on lines 76–77, are used in the server routine for temporarily storing address/new password/previous password triples. The class Database, declared on lines 80–88, represents the database (618 in FIG. 6A) used by the server to track EASS embedded agents that are authorized by the server. The methods declared on lines 83–87 allow for adding new agents into the database, updating a database entry corresponding to an agent, retrieving the contents of an entry corresponding to an agent, and deleting the entry for an agent. The address of an EASS embedded agent is used as the unique identifier to identify that agent's entry in a database. In other implementations, a unique identifier may be generated and stored in the database for each EASS embedded agent authorized by the server routine rather than using the address of the EASS embedded agent.

The routine "agent," declared on lines 90–155, is an example implementation of an EASS embedded agent. The agent routine takes two passwords, "current" and "previous," as arguments. These two input arguments represent the non-volatile current and previous password registers 604 and 606 shown in FIG. 6A. Various local variables are declared on lines 92–98. These include a temporary password "tpwd," an asynchronous timer "time," an instance of the AgentMessages class "msg," an instance of the device class "dv" that represents the device controller into which the EASS embedded agent is embedded, a device message "dvmsg," and two Boolean variables "authorize" and "enabled." The agent routine is implemented within a single "do" loop starting at line 100 and ending at line 154. Within this "do" loop, the agent routine continuously receives and responds to messages from a remote EASS server as well as passes messages exchanged between the CPU and the device controller in which the EASS embedded agent is embedded.

A large portion of the message handling logic is enclosed within a try block that begins on line 102 and ends on line 137. Exceptions generated during execution of the code within the try block are handled in the catch block beginning on line 138 and extending to line 153. In the case of the agent routine, exceptions are generated by the asynchronous timer "time." Within the "while" loop that begins on line 104 and extends through line 132, the agent routine handles any messages received from a remote EASS server and responds to those messages as necessary. The "while" statement on line 104 iteratively calls the getnext method of the Agent-Messages instance "msg" to retrieve each successive message that has been received and queued internally by msg. When the member "getNext" returns a TRUE value, msg has set an internal pointer to make the next queued message the current message. When the member "getNext" returns a FALSE value, there are no further messages that have been received and queued. Thus, any members of msg called within the "while" loop on lines 106–130 that retrieve values from messages retrieve those values from the current message.

If the current message is an AUTHORIZE message, as detected on line 108, the agent routine saves the new password contained in the AUTHORIZE message in the local password variable "tpwd," on line 109, and returns a CONFIRM AUTHORIZE message to the EASS server on line 110. If the message received from the EASS server is an OK message, as detected on line 112, the routine agent first checks, on line 113, if the new password contained within the OK message is the same as the new password stored in the local password variable "tpwd." If so, the routine agent reinitializes the asynchronous timer on line 115, sets the local variable "authorized" to the value TRUE on line 116, transfers the contents of the password variable "current" into the password variable "previous" on line 117, transfers the new password from the local password variable "tpwd" into the local password variable "current," and, if the local variable "enabled" contains the value FALSE, enables the device by calling the member "enable" on line 121 and sets the local variable "enable" to TRUE on line 122. If, on the other hand, the new password contained in the OK message is not equal to the new password contained in the local password variable "tpwd," then the agent routine simply ignores the received OK message. If the message received is a device message, as detected on line 126, and if the local variable "enabled" has the value TRUE, then the agent routine passes that received device message on to the device by calling the device member "send" on line 127. If the received message is not of the type AUTHORIZE, OK, or DEVICE, the agent routine simply ignores the message.

Once all the received and queued messages have been handled in the "while" block starting on line 104 and continuing to line 132, the agent routine passes any messages sent by the device to the CPU if the local variable "enable" has the value TRUE. Messages are received from the device by calling the receive member of the Device instance "dv" and are transmitted by the agent routine to the CPU by calling the member "sendDeviceMsg" of the Agent-Messages instance "msg."

If the asynchronous timer "time" expires and generates an interrupt, that interrupt is handled on lines 140–152. If the local variable "authorized" has the value TRUE, then authorized is set to the value FALSE on line 142, a SAVE ME message is sent by the agent routine to the EASS server on line 143, and the asynchronous timer "time" is reinitialized on line 144. However, if the local variable "authorized" has the value FALSE, then the asynchronous timer has already once expired after the agent routine failed to acquire authorization from the remote EASS server. In that case, the agent routine sets the local variable "enable" to FALSE on line 148, sends another SAVE ME message to the EASS remote server on line 149, reinitializes the asynchronous timer on line 150, and finally disables the device on line 151 by calling the member "disable" of the Device instance "dv."

The routine "server" on lines 157–264 implements the EASS server. Local variables are declared on lines 159–167, including an instance of the Messages class "msg," an instance of the Passwords class "pwds," an instance of the Database class "db," and an instance of the TimeServer class "ts." A number of local PASSWORD variables are declared, including the local variables "current," "previous," "dcur," "dprev," "newp," "queuedNew," "queuedCurrent," and "newpass." In addition, a local TIME variable "tm," a local ADDRESS variable "add," and a local Boolean variable "auth" are declared.

The server routine continuously receives messages from EASS embedded agents and, as necessary, responds to those messages in the "while" loop beginning on line 169 and ending on line 262. The server routine receives only two types of messages: SAVE ME messages as detected on line 173, and CONFIRM AUTHORIZE messages, as detected on line 220.

If the next received message is a SAVE ME message, the server routine first extracts the current and previous passwords from the SAVE ME message and places them into the local PASSWORD variables "current" and "previous," respectively. The server routine then attempts to dequeue an address/new password/current password triple from the "pswds" instance of the Passwords class. The address of the EASS embedded agent that sent the SAVE ME message is used as a unique identifier to locate the queued triple. If a triple is found, as detected on line 176, and if the current password extracted from the SAVE ME message is equal to the current password saved within the triple, as detected on line 178, then the server routine must have previously sent an AUTHORIZE message to the EASS embedded agent, but the handshake mechanism must have failed after the AUTHORIZE message was sent. In this case, the server routine simply generates a new password on line 180, queues the address/new password/current password triple on line 181, and sends a new AUTHORIZE message to the EASS embedded agent on line 182. If, on the other hand, the current password extracted from the SAVE ME message is not equal to the current password dequeued from pswds, a more serious error has occurred and the routine server throws a QUEUED_AND_SAVE_ME exception on line 184. The exception handlers are not shown in this example program because they are quite dependent on implementation details and detailed error handling strategies that may vary depending on the use to which the EASS has been applied.

If there is no queued entry for the EASS embedded agent, then, on line 188, the server routine calls the initialPassword member of pswds in order to determine whether both the current and previous passwords that were included in the SAVE ME message are special initial passwords. If these passwords are initial passwords, then, beginning on line 191, the server routine deletes any database entries for the EASS embedded agent, generates a new password, queues a new address-new password-current password triplet, and sends an AUTHORIZE message to the EASS embedded agent on line 194. This is done because the SAVE ME message was sent from an EASS embedded agent in the Initial Power-On Grace Period state (410 in FIG. 4), or, in other words, from an EASS embedded agent that is attempting to connect to the server either for the first time or for the first time following a reinitialization. If, on the other hand, the current and previous passwords in the SAVE ME message are not initial passwords, then the server routine attempts, on line 198, to retrieve from the database an entry corresponding to the EASS embedded agent identified by the address of the agent. If an entry exists in the database, then the server routine attempts to identify, on lines 200–217, a scenario by which the SAVE ME message was sent by the EASS embedded agent. If no entry is present in the database for the EASS embedded agent, then the server routine throws an alarm exception on line 217. This alarm exception indicates a potential attempt by a stolen or otherwise misused PC to establish a connection and authorization with the EASS server represented by the server routine.

On line 200, the server routine compares the current password stored within the retrieved database entry to the current password retrieved from the SAVE ME message and compares the expiration time stored in the database to the current time as retrieved by the operating system routine "getSystemTime." If the current password in the database entry is the same as the current password in the SAVE ME message and authorization has not yet expired for the EASS embedded agent, then a likely explanation for the SAVE ME message is that a previous CONFIRM AUTHORIZE message sent from the EASS embedded agent to the server routine was lost. Therefore, the server routine, on lines 202–204, generates a new, non-initial password, queues a new address-new password-current password triple, and sends a new AUTHORIZE message to the EASS embedded agent. If, on the other hand, the previous password from the database entry equals the current password in the SAVE ME message and authorization has not expired, then an OK message from the server routine to the EASS embedded agent was probably lost, and the server routine resends the OK message on lines 208–209. If the previous password from the database entry equals the current password in the SAVE ME message and authorization has expired, probably multiple OK messages have been lost indicating some error in communications, and the server routine throws a MULTIPLE_OKS_LOST exception on line 213. Finally, if the contents of the database entry do not reflect one of the above three scenarios handled on lines 200–214, the received SAVE ME message most likely indicates an attempt to establish a connection and acquire authorization by a stolen or misused EASS embedded agent and the server routine therefore throws an alarm exception on line 215.

When the server routine receives a CONFIRM AUTHORIZE message, it first extracts the new password and current password from the CONFIRM AUTHORIZE message on lines 221 and 222. The server routine then attempts to dequeue an address-new password-current password triple on line 223 corresponding to the EASS embedded agent that sent the CONFIRM AUTHORIZE message. If a queued triple is found, then the code contained in lines 225–255 may be executed in order to properly respond to the CONFIRM AUTHORIZE message. If there is no queued triple, then, on line 256, the server routine throws an alarm exception to indicate a potential attempt to connect to the server and to acquire authorization from the server by a stolen or misused EASS embedded agent. After dequeuing a triple, the server routine checks, on line 227, whether the new password and current password retrieved from the CONFIRM AUTHORIZE message correspond to the new password and current password that were queued in the dequeued triple. If so, then the server routine attempts, on line 227, to retrieve a database entry for the EASS embedded agent. If a database entry is retrieved, then the server routine tests, on line 229, whether the current password in the database entry is equal to the current password in the CONFIRM AUTHORIZE message. If so, the CONFIRM AUTHORIZE message is a valid response to a previous AUTHORIZE message sent by the server routine to the EASS embedded agent, and, on lines 231–234, the server routine updates the database entry for the EASS embedded agent and sends an OK message to the agent. If, on the other hand, the current password retrieved from the database entry is not equal to the current password that was retrieved from the queue, the server routine throws a CONFIRM_AUTHORIZE_SYNC exception on line 238. If there was no database entry corresponding to the EASS embedded agent, but if the current password included in the CONFIRM AUTHORIZE message was an initial password, then this CONFIRM AUTHORIZE message came from a EASS embedded agent in the Initial Power-On Grace Period (410 in FIG. 4) and the server routine creates a new database entry for the EASS embedded agent and sends an OK message to the EASS embedded agent. However, if the password included in the CONFIRM AUTHORIZE message is not an initial password, then the server routine throws a NO_ENTRY exception indicating a serious problem in the handshake. If no triple was found in the queue corresponding to the EASS embedded agent that sent the CONFIRM AUTHORIZE message, the server routine, on line 256, throws a QUEUE_ERROR exception indicating a potential problem with the queuing mechanism.

One skilled in the art will recognize that the above-described implementation of an example EASS server and EASS embedded agent describes one potential embodiment of the present invention and that other implementations may be realized. For example, the EASS server can be implemented in any number of programming languages for any number of different operating systems and hardware platforms. The EASS embedded agent is preferably implemented as a hardware logic circuit within the device controller for the device into which the EASS embedded agent is embedded. A hardware logic circuit cannot be removed without destroying the device controller. A firmware or software routine can, by contrast, be removed or re-installed. The handshake mechanism can be implemented with any number of different communication message protocols, with any number of different types of databases, and with any number of different strategies for handling potential error and alarm exception. Furthermore, additional error and alarm conditions might be detected by a more elaborate implementation. The database may itself be encrypted or protected by additional security mechanisms.

In the above-described embodiment, an EASS embedded agent can only receive authorization by first sending a SAVE ME message to an EASS server. In alternative embodiments, the EASS server or a user of the system hosting the EASS embedded agents may be provided with the capability to initiate authorization of an EASS embedded agent. Moreover, the EASS embedded agents may be manufactured to contain an initial unlock password and to initially have an unlimited period of authorization. Once the system hosting the EASS embedded agent is powered up and running, the EASS embedded agent can then be identified by an EASS server and controlled by the EASS server by sending the EASS embedded agent an authorization for a period of time which overrides the unlock password and initial unlimited period of authorization and which requires the EASS embedded agent to be e-authorized prior to expiration of the period of time of authorization.

Additional EASS Components and Additional Applications for the EASS

The EASS server may include a package of system administration utilities that allow a system administrator to configure and monitor the EASS server's authorization activities. These utilities can be used to graphically display the contents of the database associated with the EASS server and to allow the system administrator to manipulate those contents. Also, the EASS client and EASS server may contain additional utilities that allow a privileged user to reinitialize EASS embedded agents in the event of disconnections or corruptions so that the EASS embedded agents can reconnect to EASS servers to reestablish authorization.

The embodiments of the present invention described above are directed towards providing component-level security for a PC. The EASS does not require users to know or remember passwords. All password information is internally generated and internally manipulated by the EASS. The EASS cannot be easily thwarted by reconfiguring the software on a PC or even by replacing a firmware component such as a PROM. This is because the EASS embedded agents are contained within the ASICs that implement the various device controllers. If those EASS embedded agents do not quickly establish a connection to an EASS server and do not quickly transition from an Initial Power-On Grace Period state or a Power-On Grace Period state to an Authorized state, the devices controlled by the EASS embedded agents will fail to operate.

In the special case of an EASS embedded agent that is embedded within the circuitry of a hard disk controller, the EASS embedded agent may additionally encrypt data that is received over a communications bus for storage on the physical platters of the disk and may decrypt data read from those physical platters before sending the data back through the communications bus. In this fashion, even if a thief were to steal the hard disk and remove the disk controller circuitry, the data contained on the disk would not be available for use. The data can be encrypted by any of many well-known techniques, including RSA-based encryption and password-based encryption.

In addition, embodiments of the present invention have applications in other areas related to security and in many areas not related to security. One area in which the present invention can be applied is that of enabling hardware or software components of a PC from a remote site on a pay-per-use or pay-for-purchase basis. It is increasingly common that the actual incremental costs of installing a specialized hardware device or specialized software program during the manufacturing process is quite small for a given PC. For example, the cost of installing a software program on a hard disk during the manufacturing process may have an incremental cost of well under a dollar. Likewise, the actual physical circuitry that implements many specialized devices can be mass produced at a very low cost per unit. However, the cost of installing the specialized hardware components or software once the PC has been manufactured and sold may be much higher. For this reason, it is desirable for PC manufacturers to include popular specialized hardware devices and software programs at the time of manufacture in a disabled state. The purchaser of the PC can then pay a fee either for using the hardware components or software programs or can later purchase the hardware components or software programs. In the former case, the device or program can be enabled, or authorized, for some time period. In the latter case, the device or software program can be enabled on a permanent basis. Embodiments of the present invention, including a server, client, and a number of embedded agents, could be used as a basis to provide for selectively enabling and disabling both hardware components and software programs. In the case of software programs, for example, the embedded agent within the disk controller could selectively make available data stored on the disk, including a non-volatile copy of the software program to be enabled.

In a slightly different application of the present invention, the EASS may be employed to protect software manufacturers from software pirates. Software programs, including operating system software, can be manufactured to require authorization by EASS embedded agents, or software-implemented EASS embedded agents may be incorporated into the software programs themselves. Thus, for example, a running database management system or operating system may incorporate software-implemented EASS embedded agents that require periodic authorization from an EASS server. Alternatively, an EASS embedded agent within the disk controller on which the programs are stored may be controlled by an EASS server to selectively enable and disable particular programs.

Another application for embodiments of the present invention is in the field of adaptive systems. Such systems automatically reconfigure themselves to adapt to changing demands placed on their components. The protocol for communications between a server and embedded agents can be expanded to allow for general information exchange relating to the load experienced by a particular device and the throughput achieved by the device. The server can collect such information and direct the embedded agents to enable additional components where needed or to fine tune and adjust the operation of components to better handle the demands placed on the components. For example, additional CPUs or disk drives can be enabled and configured into the system when processing bottlenecks and non-volatile storage space becomes scarce. System components can be enabled and disabled in order to effect load balancing.

The present invention may be applied to security systems for devices other than PCs, including more complex computer systems or even to electromechanical systems such as airplanes, automobiles, diesel locomotives, and machine tools. The present invention could also be applied in industrial control processes to start and stop production components and machine tools.

Embodiments of the present invention also may be applied to protecting firearms. Electromechanical devices that include EASS embedded agents may be incorporated into electromechanical trigger locks or firing mechanisms. Authorization of the EASS embedded agents might be controlled from a centralized EASS server to insure that only licensed firearms within predetermined geographical locations can be fired. In such cases, the communications medium that allow exchange of messages between an EASS server and an EASS embedded agent may be a microwave or satellite link.

Diagnosing and correcting defects in complex systems is yet another problem area in which the present invention may find application. In the embodiment discussed above, the EASS server can easily determine when a particular EASS embedded agent is no longer functioning, indicating that the EASS embedded agent and the device controller into which it is embedded have been powered down or damaged. A system administrator or a diagnostician can use a graphical display of contents of the database associated with the EASS server to identify powered-down or defective devices. In this case, the database could be expanded to include more specific information about the geographical location of each EASS embedded agent, as well as the identity and type of device that the EASS embedded agent is controlling. The data included in the database can be presented in many different fashions with a variety of different graphical user interfaces allowing, for example, information about all the EASS embedded agents within a particular computer to be displayed within a diagram of that computer. As another example, EASS embedded agents may be incorporated into control points within utility energy grids to provide diagnostic and maintenance capabilities.

EASS embedded agents may be embedded into home entertainment systems to protect the home entertainment systems from theft and misuse. EASS embedded agents may also serve to obtain identification information from media containing recorded audio and/or video data inserted into a home entertainment system, or similar broadcast or display device, and provide the identification information to a remote server in order to receive authorization from the remote server for broadcast or display of the recorded audio and/or video data. Similarly, EASS embedded agents may serve to obtain identification information from an electronic card or key in order to obtain authorization from a remote server for the operation of a motorized vehicle or firearm. EASS embedded agents may even be embedded in paper currency or cash machines to monitor cash transactions and prevent acceptance of counterfeit currency. The fact that, in all of these applications, an EASS embedded agent is involved in obtaining identification information from media, electronic cards, or keys, provides for remote monitoring of the use of protected systems and flexible remote control of the authorization for use of the protected systems. For example, although a thief may steal both a car and the key to the car, the owner can still contact the administrator of the remote server to discontinue authorization of the use of the car.

Although the present invention has been described in terms of preferred embodiments, it is not intended that the invention be limited to these embodiments. Modifications within the spirit of the invention will be apparent to those skilled in the art, and in alternate scenarios as described above. For example, while EASS embedded agents are preferably implemented as hardware circuitry, software implementations could be devised to provide an EASS that can be implemented on existing computers without specialized circuitry built into device controller ASICs. As pointed out above, the EASS client could possibly be omitted in certain embodiments where it is possible to directly establish communications between EASS embedded agents and EASS servers. The method in which the EASS server stores and manipulates stored authorization and embedded agent information may differ widely in different embodiments. A relational database, a flat file, record-based database, or an object-oriented database could be used to store the information, and any number of hybrid systems can be devised using combinations of these types of databases. The handshake mechanism, the mechanism for announcing the presence of embedded agents, and the mechanism for reinitializing embedded agents can differ markedly in different embodiments, as can the formats and contents of the messages exchanged between EASS servers and EASS embedded agents. Certain embodiments may allow a particular EASS embedded agent to communicate with several EASS servers in order to provide additional reliability or geographical flexibility. An EASS server may be owned and operated by an entity protecting its own, on-site computers or machines, or an EASS server service may be provided by specialized security providers over the Internet or other communications media. Any number of different types of devices can be controlled by EASS embedded agents implemented either as hardware circuitry within the devices, as specialized programs within other programs that control the device, or implemented as hardware/software hybrids. The present invention can be applied not only to the problem of securing PCs and components within PCs, but also to problems of fault tolerance, adaptive systems, reconfiguration of systems, monitoring of components within systems, and other similar systems or environments.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A system for preventing theft or misuse of a computer system, the system comprising:
   a computer system having a device;
   an agent embedded in the device that, when authorized, enables operation of the device and that, when not authorized, disables operation of the device; and
   a server coupled to the embedded agent that, by exchanging a number of messages with the embedded agent that together compose a handshake operation, authorizes the embedded agent to enable operation of the device.

2. The system of claim 1 wherein the device contains a logic circuit and the embedded agent is implemented as a logic circuit within the logic circuit of the device.

3. The system of claim 1 wherein the device transmits and receives data and control signals via a bus and wherein the embedded agent intercepts the data and control signals transmitted to the device prior to reception by the device and intercepts the data and control signals transmitted from the device prior to transmission of the data and control signals to the bus.

4. The system of claim 3 wherein the embedded agent enables the device by passing the data and control signals intercepted by the embedded agent to and from the device and wherein the embedded agent disables the device by not passing the data and control signals intercepted by the embedded agent to and from the device.

5. The system of claim 4 wherein the embedded agent is embedded in a disk drive and wherein, when authorized by the remote server, the embedded agent encrypts all intercepted data before passing the data to the disk for storage and decrypts all data intercepted from the disk drive before passing the data to the bus.

6. The system of claim 5 wherein the server continuously authorizes the embedded agent by undertaking handshake operations and wherein, when the coupling between the server and the embedded agent is interrupted or broken so that the embedded agent cannot receive additional messages from the server, the embedded agent disables the device by preventing access to the disk drive via the disk drive and by not providing decryption of the encrypted data stored on the disk drive, thereby disabling the computer system and preventing use of the computer system.

7. The system of claim 1 wherein the handshake operation comprises:
   an authorization message sent from the server to the embedded agent;
   following reception of the authorization message by the embedded agent, a confirm authorization message sent from the embedded agent to the server; and
   following reception of the confirm authorization message by the server, completion message sent from the server to the embedded agent.

8. The system of claim 7 wherein the server authorizes the embedded agent to enable operation of the device for a certain period of time by including in the completion message the period of time for which the server authorizes operation of the device.

9. The system of claim 8 wherein the embedded agent includes a timer that is set to expire prior to expiration of the period of time of authorization received by the embedded agent in a completion message and wherein, when the timer expires, the embedded agent sends a solicitation message to the server requesting that the server undertake a handshake operation in order that the embedded agent receives an additional authorization period from the remote server to enable continuous operation of the device.

10. The system of claim 9 wherein the server repeatedly undertakes a handshake operation prior to expiration of the current period of time for which the embedded agent is authorized to enable operation of the device so that operation of the device is not disabled during the time that the computer system is powered on and the embedded agent is coupled to the server.

11. The system of claim 10 wherein, when the device is powered on, the timer is set to a period of time sufficient for the embedded device to request a handshake operation by sending a solicitation message to the remote server and sufficient for completion of the handshake operation and wherein the embedded agent is authorized to enable operation of the device until expiration of the timer, after which the embedded agent disables the device.

12. The system of claim 11 wherein the embedded agent maintains a current password and a previous password, wherein the server maintains a current agent password and a previous agent password that correspond to the current password and previous password maintained by the embedded agent following detection of the embedded agent by receiving a solicitation from the embedded agent that includes the embedded agent's current and previous passwords; wherein the server generates a new password for the embedded agent when the server undertakes a handshake operation and includes the new password in the authorization message; wherein the embedded agent includes the new password received from the server in the authorization message as well as the current password maintained by the embedded agent in the confirm authorization message; wherein the server, upon reception of the confirm authorization message, replaces the previous agent password with the current agent password and replaces the current agent password with the new password; and wherein, upon reception of the completion message, the embedded agent replaces the previous password with current password and replaces the current password with the new password.

13. The system of claim 12 wherein the embedded agent is constructed to maintain a special initial password as both the current password and the previous password so that the server can detect when the embedded agent sends a solicitation message to the remote server for the first time.

14. The system of claim 13 wherein, when a handshake operation fails, the server can synchronize the current agent password and previous agent password maintained by the server with the current and previous passwords maintained by the embedded agent by receiving from the embedded agent a solicitation message that contains the current and previous passwords maintained by the embedded agent.

15. The system of claim 14 wherein the server continuously authorizes the embedded agent by undertaking handshake operations and wherein, when the coupling between the remote server and the embedded agent is interrupted or broken so that the embedded agent cannot receive additional messages from the server, the embedded agent disables the device thereby disabling the computer system and preventing use of the computer system.

16. The system of claim 15, further including a client component that receives messages from the server and forwards those messages to the embedded agent and that receives messages from the embedded agent and forwards those messages to the server.

17. The system of claim 16 wherein embedded agents are embedded within several device within the computer system and wherein the client component receives messages from the embedded agents and forwards those messages to the server and wherein the client component receives messages from the server and distributes those messages to the embedded agents.

18. The system of claim 1 wherein embedded agents are embedded in additional components of the computer system including a CPU and memory devices, and wherein embedded agents are implemented as one of hardware logic circuits, firmware routines, and software routines that run within the device or component within which the embedded agents are embedded.

19. A method for enabling and disabling operation of a component of a system, the method comprising:
   embedding an agent within the component;
   establishing a communications link between the embedded agent and a server; and
   when the component is to be enabled, exchanging a number of messages between the server and the embedded agent that together compose a handshake operation that results in authorization of the embedded agent to enable operation of the component for a period of time.

20. The method of claim 19, further including:
   when the last period of time for which the embedded agent has been authorized to enable operation of the component will expire within a period of time sufficient for sending a second solicitation message and for completing a handshake operation, sending a solicitation message from the embedded agent to the server in order request a handshake operation.

21. The method of claim 19, further including:
   including a timer in the embedded agent;
   when the component is powered-up or initialized for operation, setting the timer for a period of time sufficient for the embedded agent to establish the communications link with the server, to send a solicitation message to the server requesting a handshake operation, and to complete the handshake operation;

after establishing a communications link between the embedded agent and the server, sending a solicitation message from the embedded agent to the server requesting a handshake operation;

when the handshake operation is completed, resetting the timer to expire prior to expiration of the period of time for which the embedded agent is authorized to enable operation of the component to allow the embedded agent sufficient time to send a second solicitation message to the server requesting a second handshake operation and to complete a second handshake operation prior to expiration of the period of time for which the embedded agent is authorized to enable operation of the component;

when the timer expires prior to expiration of the period of time for which the embedded agent is authorized to enable operation of the component, sending the second solicitation message from the embedded agent to the server in order to request the second handshake operation and resetting the timer to expire after a period of time sufficient to send a third solicitation message to the server requesting a third handshake operation and to complete the third handshake operation; and when the timer expires following expiration of the period of time for which the embedded agent is authorized to enable operation of the component, disabling the component.

22. The method of claim 19, further including:

after establishing a communications link between the embedded agent and the server, sending a solicitation message from the embedded agent to the server requesting a handshake operation;

when the server receives the solicitation message from the embedded agent, undertaking, by the server, a handshake operation in order to authorize the embedded agent.

23. The method of claim 22 wherein the handshake operation further includes:

sending an authorization message from the server to the embedded agent;

receiving the authorization message by the embedded agent and returning by the embedded agent a confirm authorization message to the server; and receiving the confirm authorization message by the server and returning by the server an completion message to the embedded agent.

24. The method of claim 23, further including:

maintaining a current password and a previous password within the embedded agent; and maintaining a current agent password and a previous agent password within the sever.

25. The method of claim 24, further including:

prior to sending the authorization message by the server, generating a new password, storing the new password within the server, and including the new password in the authorization message;

upon receiving the authorization message by the embedded agent, storing the new password within the embedded agent and including both the new password and the maintained current password in the confirm authorization message that the embedded agent returns to the server;

upon receiving the confirm authorization message by the server, comparing the new password and the current password contained in the confirm authorization message with the new password stored within the server and the current agent password maintained within the server; and when the new password contained in the confirm authorization message is identical to the new password stored within the server and the current password contained in the confirm authorization message is identical to the current agent password maintained within the server, setting the previous agent password maintained within the server to the current agent password maintained within the server; and setting the current agent password maintained within the server to the new password stored within the server; and upon receiving the completion message by the embedded agent, setting the previous password maintained within the embedded agent to the current password maintained within the embedded agent, and setting the current password maintained within the embedded agent to the new password stored within the embedded agent.

26. The method of claim 25, further including:

constructing the embedded agent to maintain initial passwords as the current and previous passwords.

27. The method of claim 24, further including:

maintaining a linear feedback mechanism within the server that is initialized with a seed value and that successively and deterministically generates new passwords; and maintaining a linear feedback mechanism within the embedded agent that is initialized with the seed value and that successively and deterministically generates the same new passwords that are generated by the linear feedback mechanism within the server.

28. The method of claim 27, further including:

prior to sending the authorization message from the server, generating by the server a new password and including a value related to the new password in the authorization message; and upon receiving the authorization message by the embedded agent, generating a new password within the embedded agent, comparing a value related to the newly generated password within the embedded agent with the value related to the new password contained in the authorization message, and when the value related to the newly generated password within the embedded agent is identical with the value related to the new password contained in the authorization message, sending the confirm authorization message from the embedded agent to the server.

29. The method of claim 27, further including exchanging the seed value between the server and the embedded agent when the embedded agent first establishes the communications link with the server.

30. The method of claim 19 wherein the component of the system is a component of a computer system and wherein the embedded agent is embedded in the component of the computer system, and further including:

running a software program that implements the server on a remote computer to provide a remote server; and enabling operation of the computer system that contains the component by the remote server authorizing the embedded agent to enable operation of the component.

31. The method of claim 30, further including disabling the computer system causing the embedded agent to disable the component.

32. The method of claim 30 wherein the embedded agent is a software program within a controller software program that controls the component, the embedded agent communicating with the remote server via internal buses within the computer system and via external communication media between the computer system and the remote server, including at least one of local area networks, wide area networks, and combinations of local area networks and wide area networks.

33. The method of claim 30 wherein the embedded agent is a logic circuit within an application specific integrated circuit that implements the controller of a disk drive; and further including:

intercepting by the embedded agent all data transfers to the disk drive and, when authorized, encrypting the data prior to passing the data to the disk drive; and intercepting by the embedded agent all data transfers from the disk drive and, when authorized, decrypting the previously encrypted data prior to passing the data from the disk drive.

34. The method of claim 33, further including disabling and enabling specific data stored on the disk drive by including an identification of the data to be enabled and disabled in an authorization message that is sent from the server to the embedded agent.

35. The method of claim 30 wherein the component exchanges data and messages with the computer system, and further including:

intercepting by the embedded agent all messages and data exchanged between the component and the computer system;

when the embedded agent is authorized, enabling the component by passing messages and data from the computer system to the component and by passing messages and data from the component to the computer system; and when the embedded agent is not authorized, disabling the component by not passing messages and data from the computer system to the component and by not passing messages and data from the component to the computer system.

36. The method of claim 30, further including protecting the computer system from theft or misuse by requiring the remote server to repeatedly authorize the embedded agent.

37. The method of claim 30, further including selectively enabling and disabling multiple components of the computer system by embedding a plurality of agents within the multiple components and selectively authorizing the multiple components from the remote server.

38. The method of claim 37, further including exchanging additional information between the plurality of embedded agents and the remote server, including information concerning workloads placed on the components in which the embedded agents are embedded, in order to allow the computer system to enable and disable components to adjust operation of the components to operate more efficiently based upon the workload information.

39. The method of claim 37, further including enabling components of the computer system in response to receiving payments for operation of the components.

40. The method of claim 19 wherein the component of the system is an executing software program, wherein the system is a computer system, and wherein the embedded agent is implemented as a software subcomponent of the software program, the method further including:

running a software program that implements the server on a remote computer to provide a remote server; and enabling execution of the software program by authorizing the embedded agent subcomponent of the software program.

41. The method of claim 19, further including controlling use of a firearm by embedding an agent into a component of the firearm required to discharge the firearm.

42. The method of claim 19, further including controlling use of a firearm by embedding an agent into a component of the firearm required to load the firearm.

43. The method of claim 19, further including diagnosing a powered-down or disabled component by detecting when the embedded agent within the component does not respond to authorization messages sent from the server.

44. A control system for controlling operation of components within a multi-component system, the control system comprising:

an agent embedded in a component of the multi-component system that, when authorized, enables operation of the component and that, when not authorized, disables operation of the device; and a server coupled to the embedded agent that, by exchanging a number of messages with the embedded agent that together compose a handshake operation, authorizes the embedded agent to enable operation of the component.

45. The control system of claim 44 wherein the multi-component system is a computer system, wherein the embedded agent is embedded within a disk drive of the computer system, wherein the embedded agent selectively enables and disables reading and transmission of software programs stored on the disk drive to other components of the computer system, and wherein the control system implements a pay per use control system that enables software programs pre-installed in the computer system when payment is received for use of the software programs.

46. The control system of claim 44 wherein the multi-component system is a firearm, wherein the embedded agent is embedded within the firing mechanism of the firearm, and wherein the control system implements a gun control system that selectively enables use of the firearm.

47. The control system of claim 44 wherein the server monitors successful handshake operations in order to detect interruption or loss of operation of the component within which the embedded agent is embedded, thereby diagnosing interruption or loss of operation of the component.

48. The control system of claim 44 wherein the server exchanges additional informational messages with the embedded agent that enables the server to instruct the embedded agent to adjust and modify operational characteristics of the device in which the embedded agent is embedded.

49. A method for enabling the operation of a system upon receiving, by the system, a valid identifier, the method comprising:

embedding an agent within a component of the system that can receive an identifier and that can enable operation of the system;

establishing a communications link between the embedded agent and a server;

exchanging a number of messages between the embedded agent and the server that results in authorization of the embedded agent to subsequently enable operation of the system upon receiving a valid identifier; and when an identifier is received by the component of the system,
- obtaining the received identifier from the component of the system by the embedded agent;
- exchanging a number of messages between the embedded agent and the server that transfer the received identifier from the embedded agent to the server and that results in the embedded agent receiving authorization from the server to enable operation of the system when the server determines that the identifier is valid and that results in the embedded agent not receiving authorization from the server to enable operation of the system when the server determines that the identifier is invalid; and
- enabling operation of the system by the embedded agent upon receiving authorization from the server to enable operation of the system.

50. The method of claim 49 wherein the embedded agent is linked to the server via the Internet.

51. The method of claim 49 wherein the system is a computer system, wherein the identifier is included within a software computer program, and wherein the embedded agent is authorized by the server to enable the computer system to run the software computer program when the server determines that the identifier is valid.

52. The method of claim 49 wherein the system is an entertainment system that reads entertainment information from a medium and presents the entertainment information, wherein the identifier is included in the medium, and wherein the embedded agent is authorized by the server to enable the entertainment system to read the entertainment information from the medium and present the read entertainment information when the server determines that the identifier is valid.

53. The method of claim 52 wherein the entertainment system reads audio information from the medium and presents the audio information by converting the audio information into an audio signal, amplifying the audio signal, and broadcasting the audio signal through one or more loudspeakers.

54. The method of claim 53 wherein the medium is DVD disc.

55. The method of claim 53 wherein the medium is a compact disk.

56. The method of claim 53 wherein the medium is a magnetic tape.

57. The method of claim 53 wherein the medium is a broadcast electronic signal.

58. The method of claim 52 wherein the entertainment system reads video information from the medium and presents the video information by converting the video information into a visual display signal and broadcasting visual display signal through one or more visual display devices.

59. The method of claim 58 wherein the medium is DVD disc.

60. The method of claim 58 wherein the medium is a magnetic tape.

61. The method of claim 58 wherein the medium is a broadcast electronic signal.

62. The method of claim 49 wherein the system may be occupied by a human and is entered by a door, wherein the identifier is included in an electronic key, and wherein the embedded agent is authorized by the server to enable a door lock to open when the server determines that the identifier is valid.

63. The method of claim 62 wherein the system is a residence.

64. The method of claim 62 wherein the system is an automobile or truck.

65. The method of claim 62 wherein the system is an airplane.

66. The method of claim 62 wherein the system is a boat.

67. The method of claim 62 wherein the system is a tractor.

68. The method of claim 49 further including:
- periodically reacquiring the identifier by the embedded agent, exchanging a number of messages between the embedded agent and the server, and, when the server determines that the reacquired identifier is valid, re-enabling operation of the system by the embedded agent upon receiving authorization from the server to enable operation of the system; and
- when the server determines that the system has been misappropriated or is being misused, not sending to the embedded agent and further authorizations from the server to enable operation of the system so that the system becomes disabled.

69. The method of claim 68 wherein the system is an automobile or truck.

70. The method of claim 68 wherein the system is an airplane.

71. The method of claim 68 wherein the system is a boat.

72. The method of claim 68 wherein the system is a tractor.

73. The method of claim 49 wherein the system is a transaction system that accepts currency, wherein the identifier is embedded within the currency, and wherein the embedded agent is authorized by the server to accept the currency during a transaction when the server determines that the identifier is valid, and wherein the server monitors invalid identifiers in order to detect and signal fraudulent transactions and counterfeited currency.

* * * * *

UNITED STATES PATENT AND TRADEMARK OFFICE
CERTIFICATE OF CORRECTION

| | | |
|---|---|---|
| PATENT NO. | : 6,249,868 B1 | Page 1 of 1 |
| APPLICATION NO. | : 09/163094 | |
| DATED | : June 19, 2001 | |
| INVENTOR(S) | : Edward G. Sherman et al. | |

It is certified that error appears in the above-identified patent and that said Letters Patent is hereby corrected as shown below:

In column 38, claim 44, line 27, delete the word "device" and insert the word -- component --.

Signed and Sealed this

Eighteenth Day of July, 2006

JON W. DUDAS
*Director of the United States Patent and Trademark Office*